United States Patent [19]

Negishi et al.

[11] Patent Number: 5,023,631

[45] Date of Patent: Jun. 11, 1991

[54] STOPPING PROCESS CONTROL DEVICE

[75] Inventors: Kiyoshi Negishi; Ikuo Negoro; Masahiro Kita, all of Tokyo, Japan

[73] Assignee: Asahi Kogaku Kogyo Kabushiki Kaisha, Tokyo, Japan

[21] Appl. No.: 435,990

[22] Filed: Nov. 14, 1989

[30] Foreign Application Priority Data

Nov. 14, 1988 [JP] Japan ................................ 63-286993

[51] Int. Cl.⁵ ...................... G01D 15/06; G03G 21/00
[52] U.S. Cl. ...................................... 346/154; 355/206
[58] Field of Search ..................... 346/108, 153.1, 154, 346/157–160; 355/206, 208; 358/300

[56] References Cited

U.S. PATENT DOCUMENTS 4,477,178 10/1984 Furuichi et al. ..................... 355/206
4,841,337 6/1989 Hiratsuka et al. .................. 346/157

Primary Examiner—Donald A. Griffin
Attorney, Agent, or Firm—Sandler, Greenblum & Bernstein

[57] ABSTRACT

A device for controlling a process of stopping a laser printer having a printing unit including a sensitive drum and a fixing unit. The stopping process control device is provided with a detecting unit for detecting errors occurring in the laser printer, a determining unit for determining whether or not an error detected by the detecting unit is very serious, and a control unit for controlling the printing unit and the fixing unit. The control unit stops the printing unit and the fixing unit after completing a printing and a fixing of the page being printed when the determining unit determines that the error is less serious, and conversely, immediately stops the printing unit and the fixing unit when the determining unit determines that the error is very serious.

17 Claims, 29 Drawing Sheets

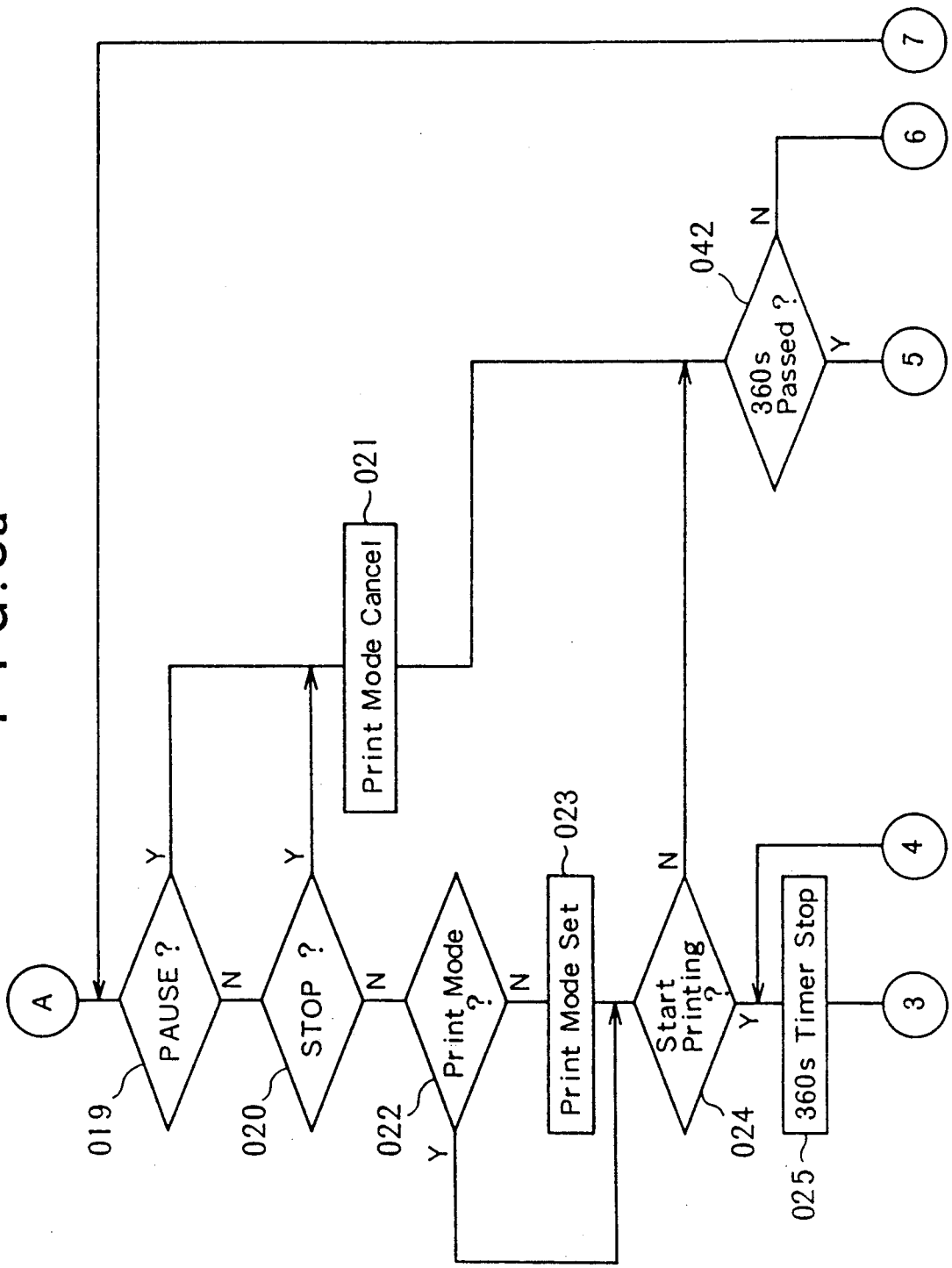

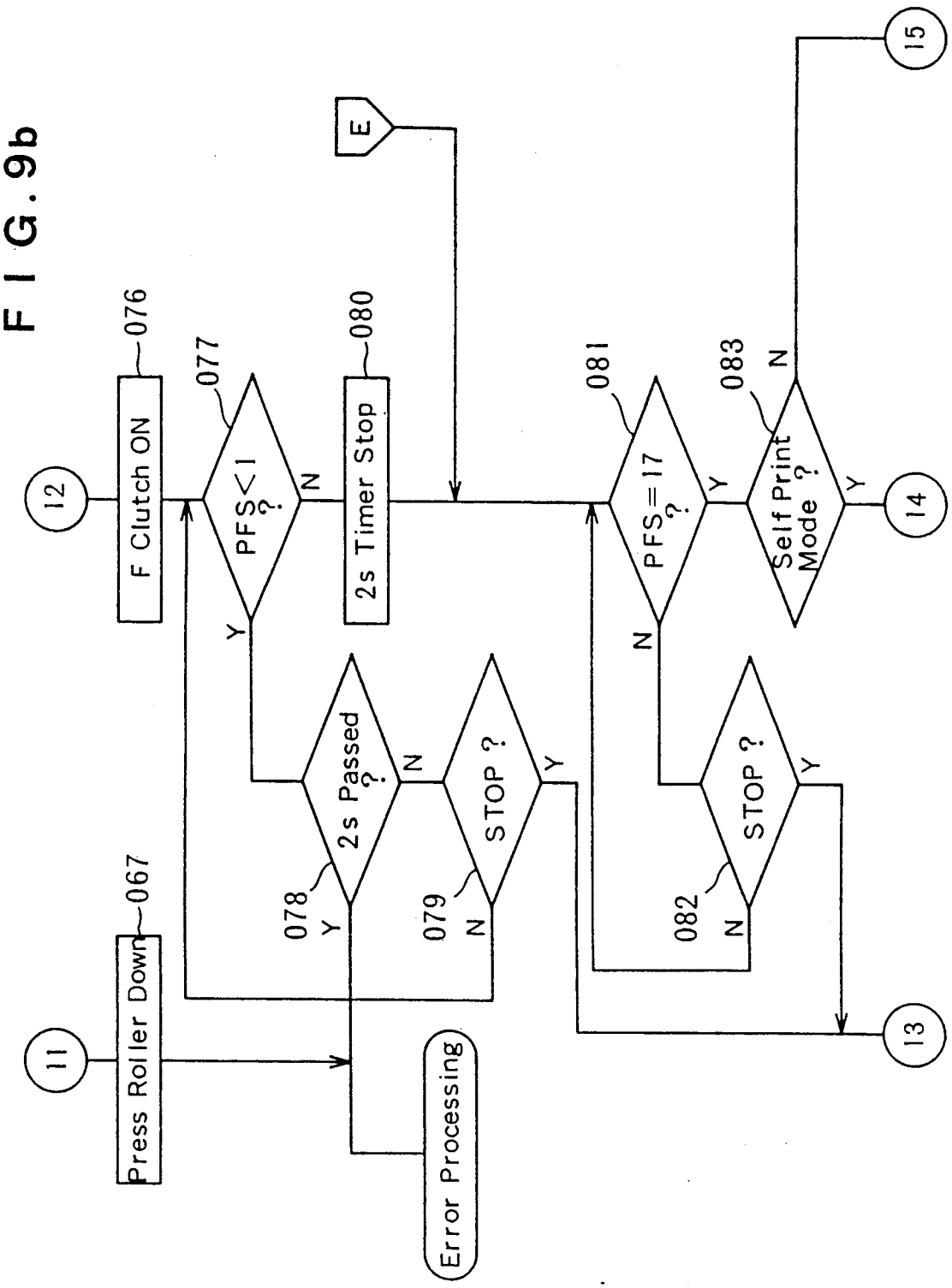

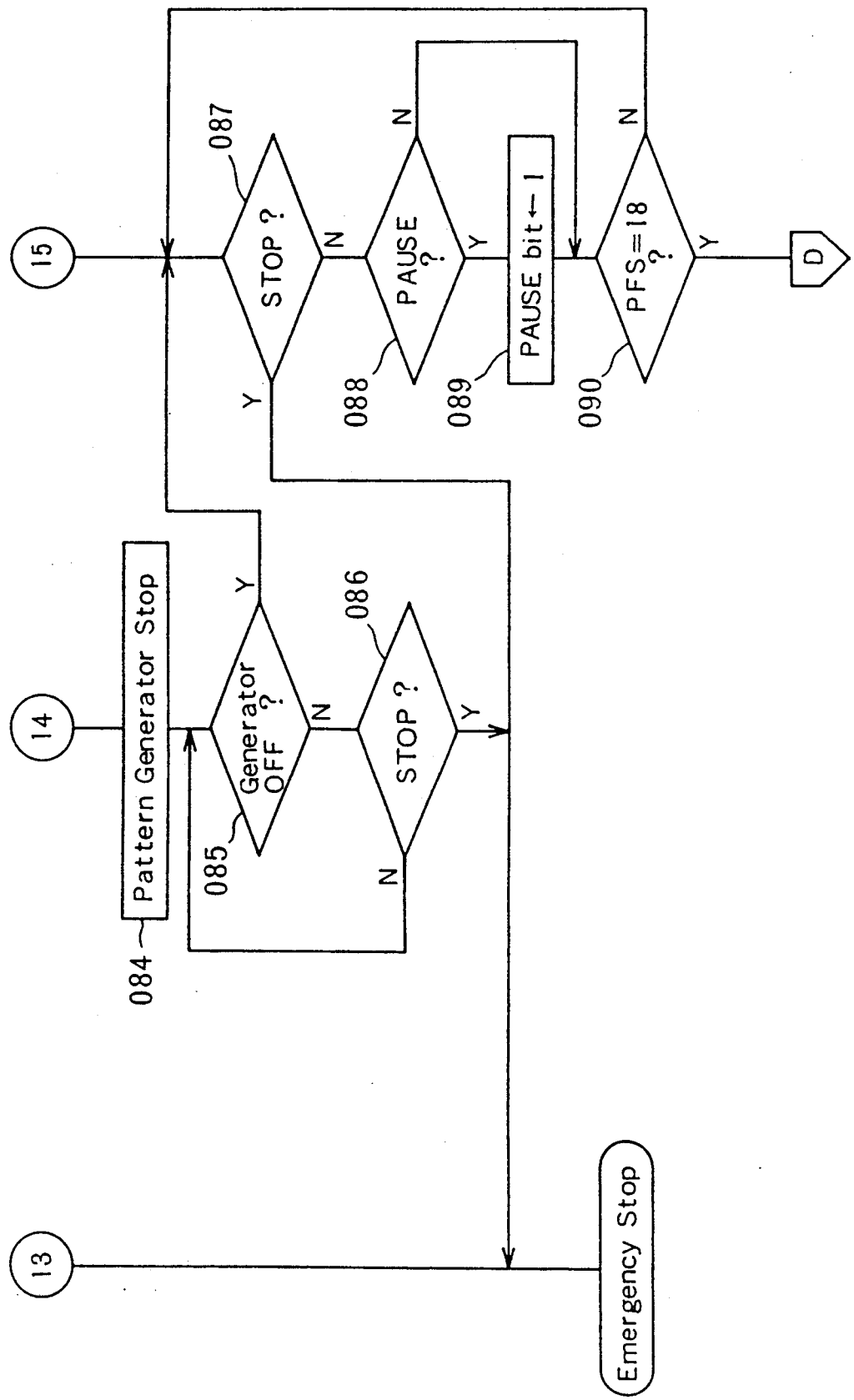

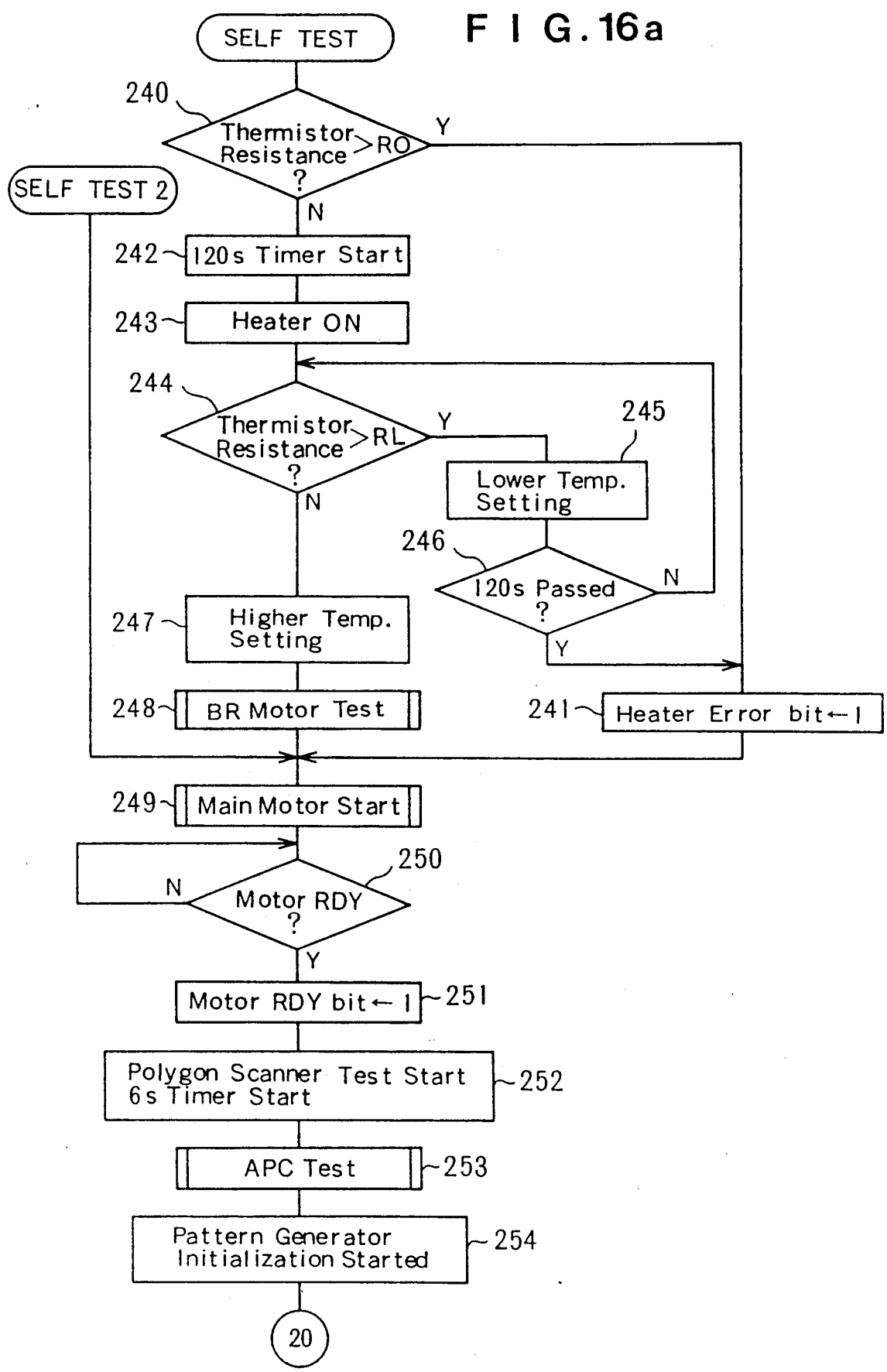

STOPPING PROCESS CONTROL DEVICE

BACKGROUND OF THE INVENTION

1. Field of the Invention

The present invention relates to a laser printer carrying out a printing process on a continuous form which is perforated at appropriate intervals to enable the continuous form to be separated into single pages. More particularly, it relates to a device for controlling a process of stopping the laser printer.

2. Description of the Related Art

The continuous form referred to in this specification is a fan-folded paper form which is foldable and is provided with sprocket holes, and is constructed in such a manner that the folding portions thereof correspond to perforations by which the continuous form is easily separated into individual pages. Usually, the continuous form is printed with ruled lines extending in a direction perpendicular to a feeding direction, at predetermined intervals, and a predetermined positional relationship exists between the sprocket holes and ruled lines.

Generally, a laser printer carrying out the printing of an image on the continuous form is provided with a printing unit having a sensitive drum on which an electrostatic latent image is formed, a developing unit for developing the electrostatic latent image using a toner, and a transfer unit for transferring the developed toner image to the continuous form. In such as laser printer, the continuous form to which the image is transferred by the printing unit is fed to fixing rollers by a feeding unit, the image is fixed to the continuous form by the fixing rollers, and the continuous form is then discharged from the laser printer.

Further, such a laser printer is provided with a plurality of error sensors for sensing various errors, such as a jam of the continuous form, a shortage of toner, and an overflow of discharged toner, and an emergency stop of the operation of the printing unit, the feeding unit and the fixing rollers is made when an error is detected by the error sensors.

In the laser printer, the errors are divided into two categories; i.e., a high priority error, such as a paper jam, which requires an emergency stop of the printing process, and a low priority error such as a shortage of toner and an overflow of discharged toner, which does not require an emergency stop of the printing process. Nevertheless, in both cases, an emergency stop of the operation of the printing unit, the feeding unit and the fixing rollers is carried out, and therefore, if a low priority error occurs when only half of a page has been printed, the printing unit, the feeding unit and the fixing rollers are stopped, and thus printing of that page is ended at a point midway down the page. Accordingly, when the error is corrected and the printing process is restarted, if the page on which the printing is ended midway down the page is discharged from the printer, and a the next page is printed again from the beginning, a problem arises in that the page on which the printing is ended midway down the page is wasted.

SUMMARY OF THE INVENTION

Therefore, an object of the present invention is to provide a stopping process control device by which, when a low priority error occurs, a page on which printing has been carried out to a point midway down the page is not wasted.

According to the present invention, there is provided a stopping process control device comprising means for detecting an error occurring in the laser printer, means for determining whether the error is very serious or less serious, and means for controlling the printing means and the fixing means to stop the operation of the printing means and the fixing means after completing a printing and fixing of a page being printed at the time when the determining means determines that the error is less serious, and to immediately stop the operation of the printing means and the fixing means when the determining means determines that the error is very serious.

BRIEF DESCRIPTION OF THE DRAWINGS

The present invention will be better understood from the description of the preferred embodiments of the invention set forth below, together with the accompanying drawings, in which:

FIGS. 7a, 7b through 10a, 10b are jointly a flow chart of a main routine;

FIGS. 16a and 16b illustrate a flow chart of a self-test routine;

DESCRIPTION OF THE PREFERRED EMBODIMENTS

Figure 1:
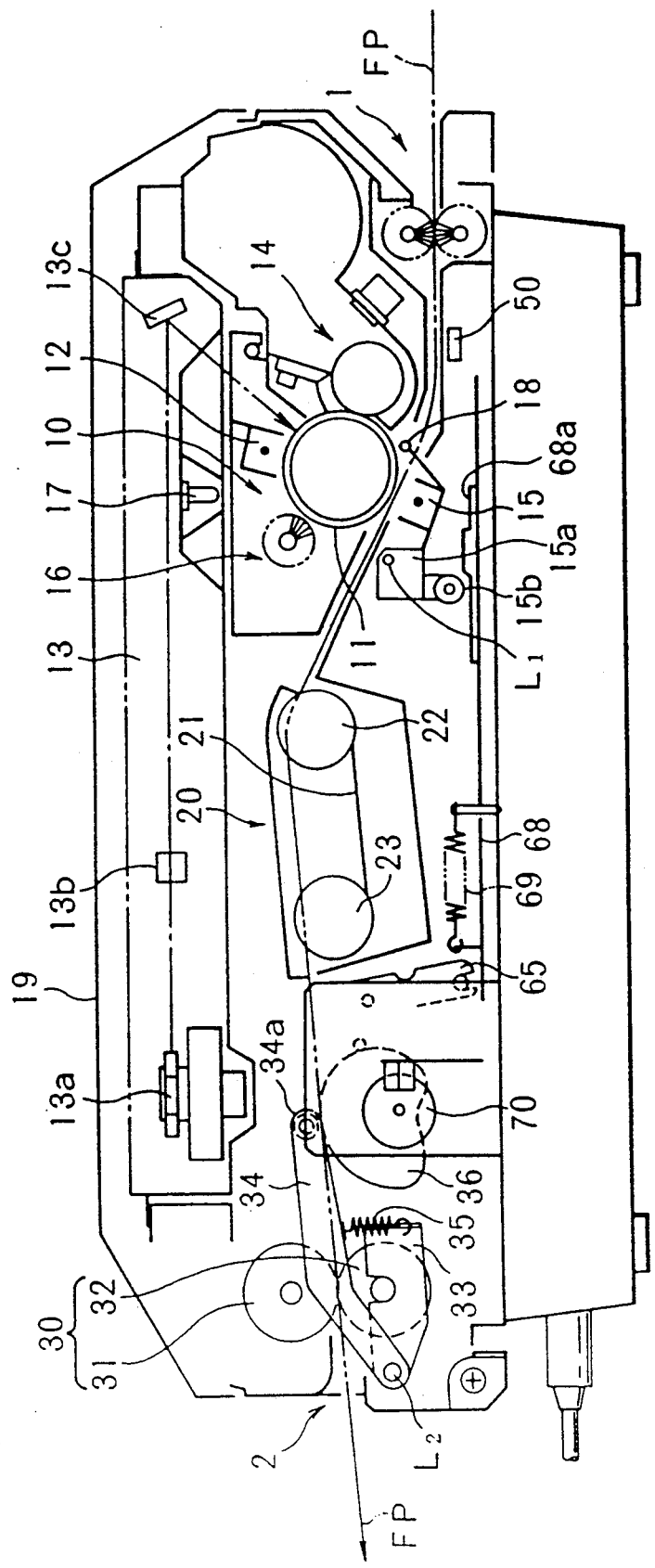
FIG. 1 is a side view of a laser printer to which an embodiment of the present invention is applied.

The present invention will now be described with reference to embodiments shown in the drawings.

FIGS. 1 through 5 show an embodiment of a device for feeding a continuous form provided in a laser beam printer, in which the continuous form is printed in accordance with print data input from a host computer, by an electrophotographing process including an exposure to a sensitive drum, a developing of the exposed image, and a transfer and fixing thereof on a page of the continuous form. Note that, although this printer is similar to a conventional dot matrix type line printer which starts a printing process by accumulating printing data for one line, since this description is concerned with the use of a continuous form, and as the printing is carried out by an electrophotographing process as described above, this printer is constructed as a page printer which starts the printing after accumulating print data corresponding to one full page of printing. This printing process is utilized because, when printing by the electrophotographing process, since the exposure position and the position at which the transfer to the continuous form is carried out are different from each other, if a printing is carried out for each line, a part of the continuous form between the exposure position and the transfer position is wasted.

The mechanical construction of the printer is described below with reference to FIGS. 1 through 5.

From an inlet mouth 1 through which a continuous form FP is supplied, to an outlet mouth 2 through which a printed form is discharged, the printer is provided with a transfer unit 10 centered around a photosensitive drum 11, a tractor unit 20 including endless belts 21 having projections engaging with sprocket holes of a continuous form FP, and a fixing unit 30 including a pair of rollers 31 and 32 for thermofixing a toner image transferred to the form, in that order.

The transfer unit 10 includes a charger 12 for charging a sensitive material on the sensitive drum 11 with electricity, a scanning optical system 13 for exposing the charged sensitive material to form an electrostatic latent image on the drum 11, a developing unit 14 for applying a toner to the formed latent image, an electrical discharge unit 15 for charging the continuous form FP to transfer the toner image thereto, a cleaning brush 16 for removing toner remaining on the drum 11, and an LED 17 for exposing the whole surface of the drum 11 to radiation to remove residual electric charges from the drum 11.

The scanning system 13 is disposed in an upper cover 19 of the printer. In the scanning system 13, a modulated beam from a semiconductor laser (not shown) is continuously deflected by a polygon mirror 13a, and is converged by an $f\theta$ lens 13b. The converged beam is reflected by a beam bender 13c to form a scanning line on the sensitive drum 11, which rotates so that an electrostatic latent image is formed on the sensitive drum 11 in the form of dots.

The electrical discharge unit 15 is fixed to an arm 15a which is rotated about a pivot L1 by a cam mechanism described later. A paper pressing roller 18 is connected to the arm 15a, at an opposite end thereof of the electrical discharge unit 15, and the continuous form FP is passed between the paper pressing roller 18 and the end portion of the arm 15a. The arm 15a is also provided with a cam follower 15b.

When using the continuous form FP, if the entire transferred part thereof is fixed, a part of the continuous form FP between the transfer position and the fixing position is left blank and discharged at the start of the next printing process, and thus is useless. Therefore, when the printing process is temporarily stopped, a problem arises of what part of the transferred continuous form FP should be fixed. Further, taking into consideration the printing performance of the printer, an interruption and a restart of the transfer and fixing process are preferably carried out at the perforated portion of the continuous form FP at which the forms are separated from each other. Accordingly, the printer of this embodiment is constructed in such a manner that a space between the transfer position and the fixing position corresponds to one page of the continuous form FP, and when the printing is stopped, a perforated portion thereof, which is a boundary between two adjacent pages, is at the transfer position or the fixing position.

When the printing is restarted, drum 11 must be allowed to run idle, so that the continuous form FP is not fed, until an exposure part of the drum reaches the transfer position of the continuous form FP. Note that, if drum 11 is rotated while the continuous form FP and the drum 11 are in contact with each other, the life of drum 11 is shortened due to an abrasion of the sensitive material thereon, and the continuous form FP is stained by a residual toner. Therefore, to avoid these problems, the printer is constructed in such a manner that, when drum 11 is running idle, arm 15a is depressed so that paper pressing roller 18 depresses an upper surface of the continuous form FP, to separate the continuous form FP from the sensitive drum 11.

Figure 2:
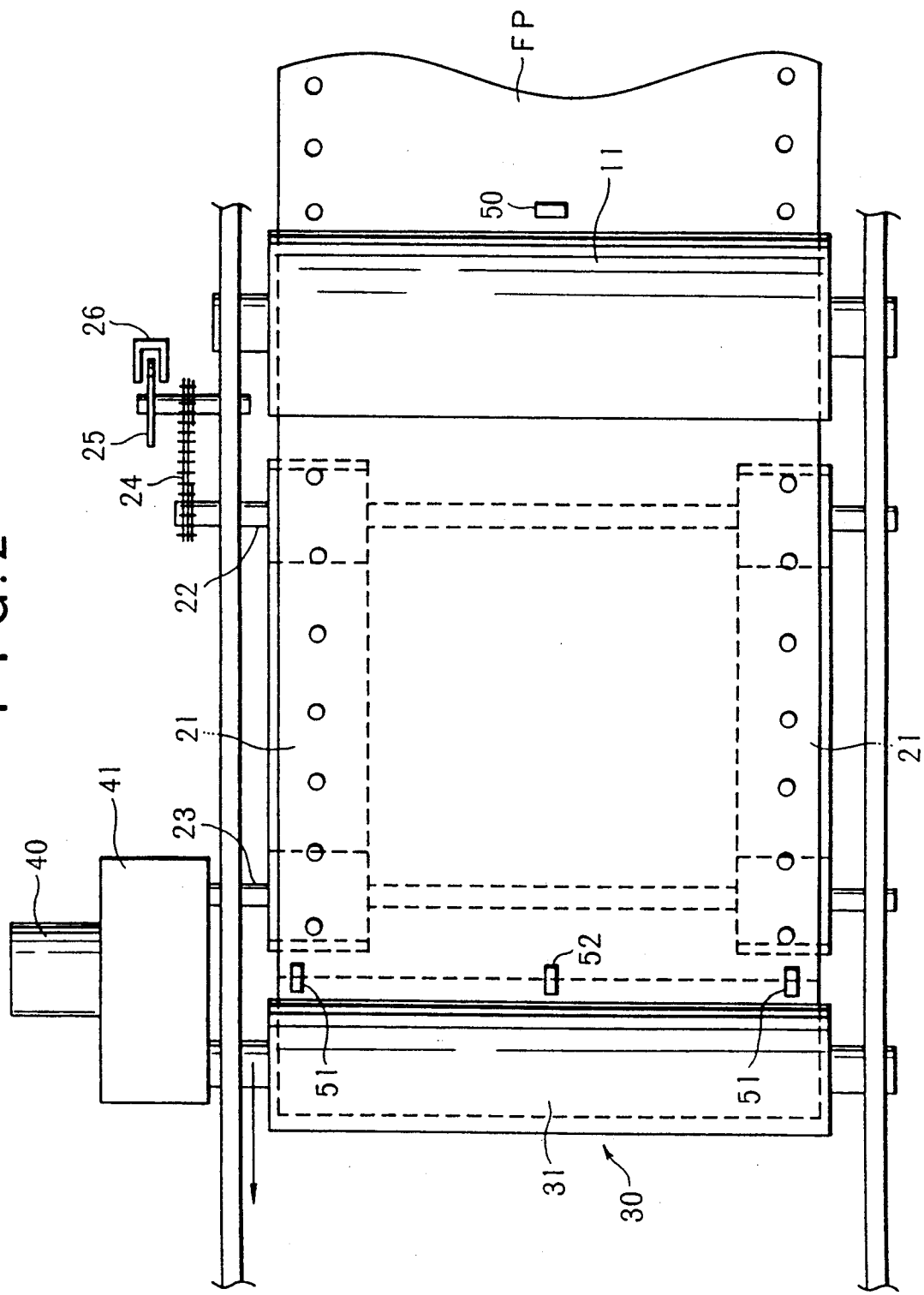
FIG. 2 is a plane view of a form feeding unit of the embodiment of FIG. 1.

As shown in FIG. 2, tractor unit 20 is constructed in such a manner that two endless belts 21, 21 wound between driven shaft 22 and a drive shaft 23 are driven by a main motor 40 through a feed clutch (referred to as the F clutch hereinafter) and a gear train provided in box 41. A gear train provided between the main motor 40 and the drive shaft 23 of the tractor unit 20 includes a one-way clutch, so that the continuous form FP is fed at 50 mm/s by only the tractor unit 20. If the form is forcibly moved by, for example, pulling, at a speed higher than 50 mm/s, the one-way clutch runs idle due to a resistance engendered by this higher speed.

Figure 4:
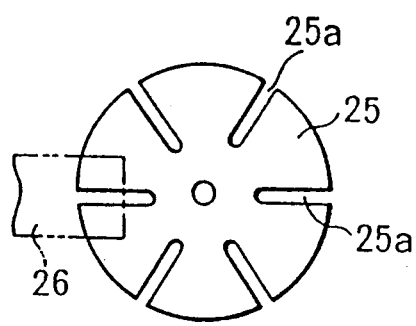
FIG. 4 is a plane view of a disk for generating a paper feed sensor (PFS) pulse.

Disk 25 is connected to the driven shaft 22 through a chain 24 and rotates in association with the driven shaft 22. As shown in FIG. 4, disk 25 is provided with slits 25a at predetermined intervals. A photocoupler 26 is mounted so that it sandwiches a part of the disk 25, and outputs pulse signals when the slits 25a pass through the photocoupler 26, in accordance with the amount fed of the continuous form FP. Hereinafter, this photocoupler is referred to as a PFS (paper feed sensor), and the output pulse is referred to as a PFS pulse. Note that one PFS pulse is outputted upon the feeding of each ½ inch of the continuous form. A pulse signal obtained from one of the slits 25a corresponds to a sprocket hole provided in the continuous form FP, and a signal obtained by a part other than the slits 25a corresponds to a part other than the sprocket holes.

The fixing unit 30 is provided with an upper heat roller 31 and a lower press roller 32. The heat roller 31 includes a halogen lamp for heating and a termistor for sensing a temperature. The press roller 32 is provided for pressing the continuous form FP passing through rollers 31 and 32 against the heat roller 31 with a predetermined pressure. The heat roller 31 is rotated by the main motor 40 through the F clutch and a gear train, and feeds the continuous form FP a speed of 75 mm/s between the rollers 31 and 32. Therefore, the actual feeding of the continuous form FP is carried out by the fixing unit 30, and the tractor unit 20 acts to impose a rearward tension to the continuous form FP, to prevent skewing thereof.

The printer is provided with three kinds of sensors along a feeding passage of the continuous form FP, to sense whether or not the continuous form FP is present in the feeding passage.

First, an empty sensor 50 is provided between the inlet mouth 1 and the transfer unit 10. In this printer, perforated portions, which are boundaries between two adjacent pages, are positioned immediately below the sensitive drum 11 of the transfer unit 10 and at the fixing rollers 31 and 32, respectively, when a printing process is stopped. Therefore, when the continuous form ends at that page, the printer senses the end of continuous form through a signal outputted by the empty sensor 50.

Second, skew sensors 51, 51 are provided between the fixing unit 30 and the tractor unit 20 and in contact with the edges of the continuous form FP, to sense a skewing and breaking of the continuous form FP. These skew sensors output a signal when at least one of the edges of the continuous form FP has risen.

Third, a tip sensor 52 is provided between the two skew sensors 51, 51. This tip sensor 52 senses a tip portion of the continuous form FP when a positioning of the continuous form FP is carried out.

As it takes time to heat the heat roller 31 from a room temperature to a temperature necessary for the fixing, the heat roller 31 is heated while waiting for the start of a next printing operation. Note that since the continuous form FP is used in this printer, if the continuous form FP is always in contact with the heat roller 31, burning or blistering of the paper may occur. Therefore, press roller 32, facing the heat roller 31, is constructed to be able to move up and down, so that the press roller 32 can be moved down and thus be separated from the continuous form FP when waiting for the start of a next printing operation.

Both ends of the press roller 32 are supported by arms 33 rotatably fixed to the chassis of the printer through a pivot L2. The arms 33 are connected to a lever 34 by a tension spring 35, and the lever 34 is rotatably fixed to the chassis of the printer through the pivot L2, similar to arms 33. Lever 34 is provided with a cam follower 34a at a tip portion thereof, and this cam follower 34a engages with a cam 36 and is swung up and down by a rotation of the cam 36, so that the lever 34 and arms 33 move up and down to move the press roller 32 up and down. The downward movement of the press roller 32 is generated by the deadweight thereof.

Note that the up and down movements of the press roller 32 and the up and down movements of the electrical discharge unit 15 are carried out by the same driving means, as described below.

Figure 3:
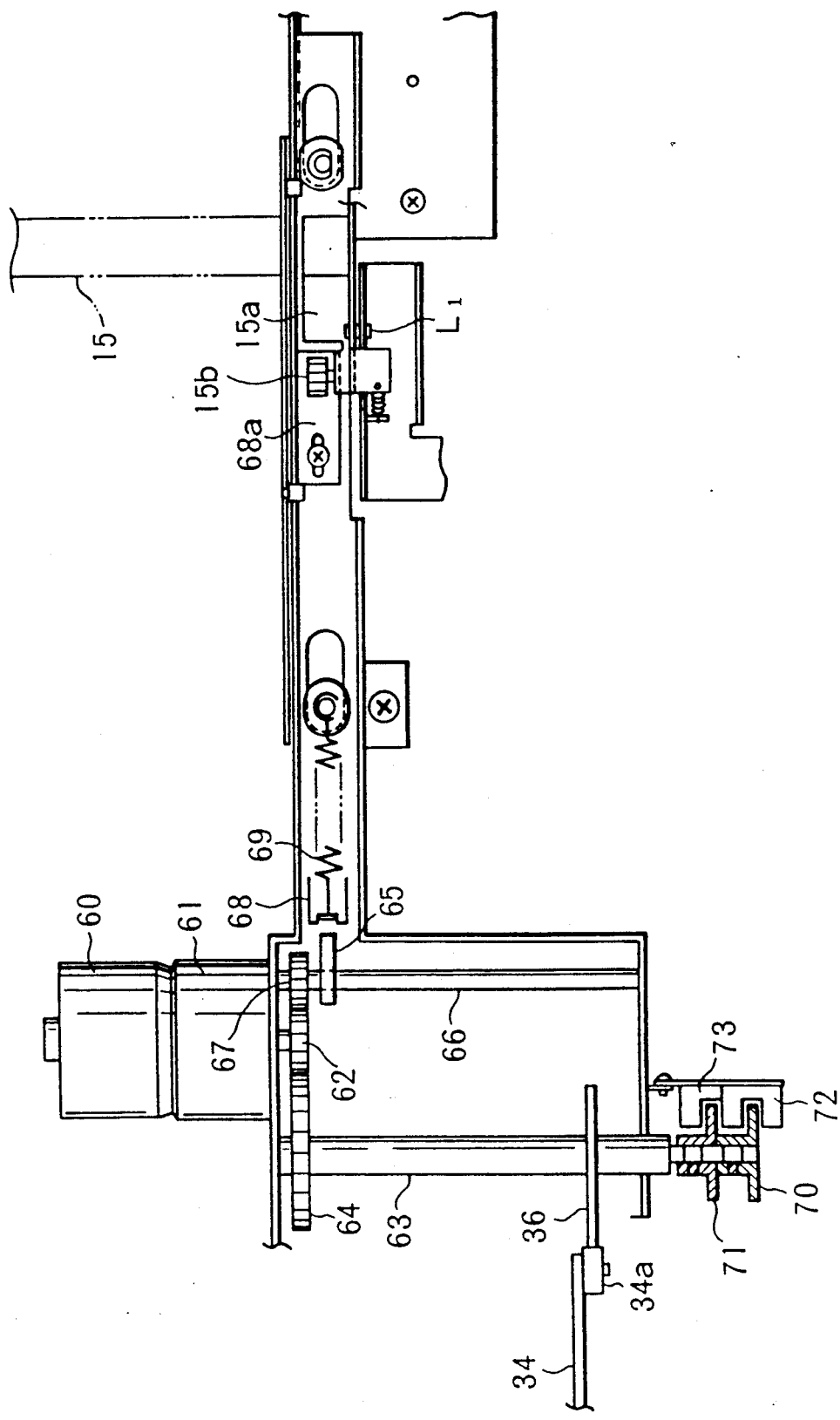
FIG. 3 is a sectional view of a part near a backup roller (BR) motor.

The drive source is a backup roller motor (referred to as a BR motor hereinafter) 60 provided under the feeding passage of the continuous form FP, as shown in FIG. 3. A gear 62, driven by the BR motor 60 through a reduction mechanism 61, meshes with gear 64 connected to shaft 63 to which the cam 36 is fixed at one portion thereof, and meshes with gear 67 connected to shaft 66 to which a lever 65, moving the electrical discharge unit 15 up and down, is fixed at another portion thereof.

Lever 65 is connected to a slide plate 68 which is slidable, relative to the chassis of the printer. The slide plate 68 is urged to the left in the drawing by a tension spring 69. When the slide plate 68 is slid to move against a spring force of the tension spring 69, a plate cam 68a, provided at the end of the slide plate 68, comes into contact with the cam follower 15b, to move the electrical discharge unit 15 down.

Figure 5A:
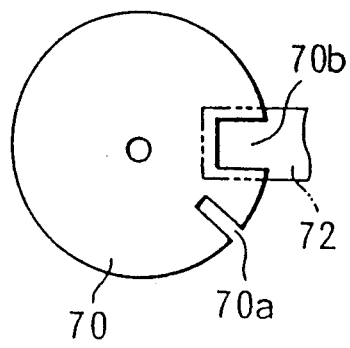
FIG. 5(A) is a plane view of a disk constructing a backup roller up (BRU) sensor.
Figure 5B:
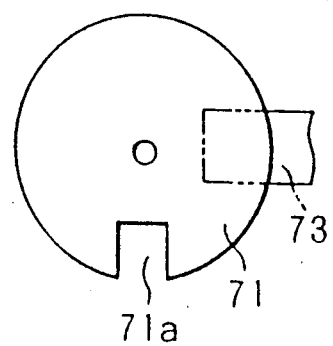
FIG. 5(B) is a plane view of a disk constructing a backup roller down (BRD) sensor.

Two disks 70 and 71 (FIGS. 5(A) and 5(B)) are fixed to shaft 63 to rotate as one body. The outside disk 70 is provided with a small slit 70a and a large slit 70b, as shown in FIG. 5(A), and the inside disk 70b is provided with a slit 71a, as shown in FIG. 5(B). Disks 70 and 71 are disposed in such a manner that parts of the disks are positioned at gaps in photocouplers 72 and 73, respectively. The disks 70 and 71 and the photocouplers 72 and 73 together construct sensors for sensing a position of the press roller 32. Note that, in the following description, a BRU (backup roller up) signal is outputted from the photocoupler 72, and a BRD (backup roller down) signal is outputted from the photocoupler 73.

The press roller 32 is positioned at a down position except when a printing process is carried out, whereby an unnecessary contact thereof with the continuous form FP is completely avoided. Therefore, as shown in a flow chart described later, when the printer is stopped due to the occurrence of errors, the press roller 32 is always retracted; i.e., moved down.

Figure 6:
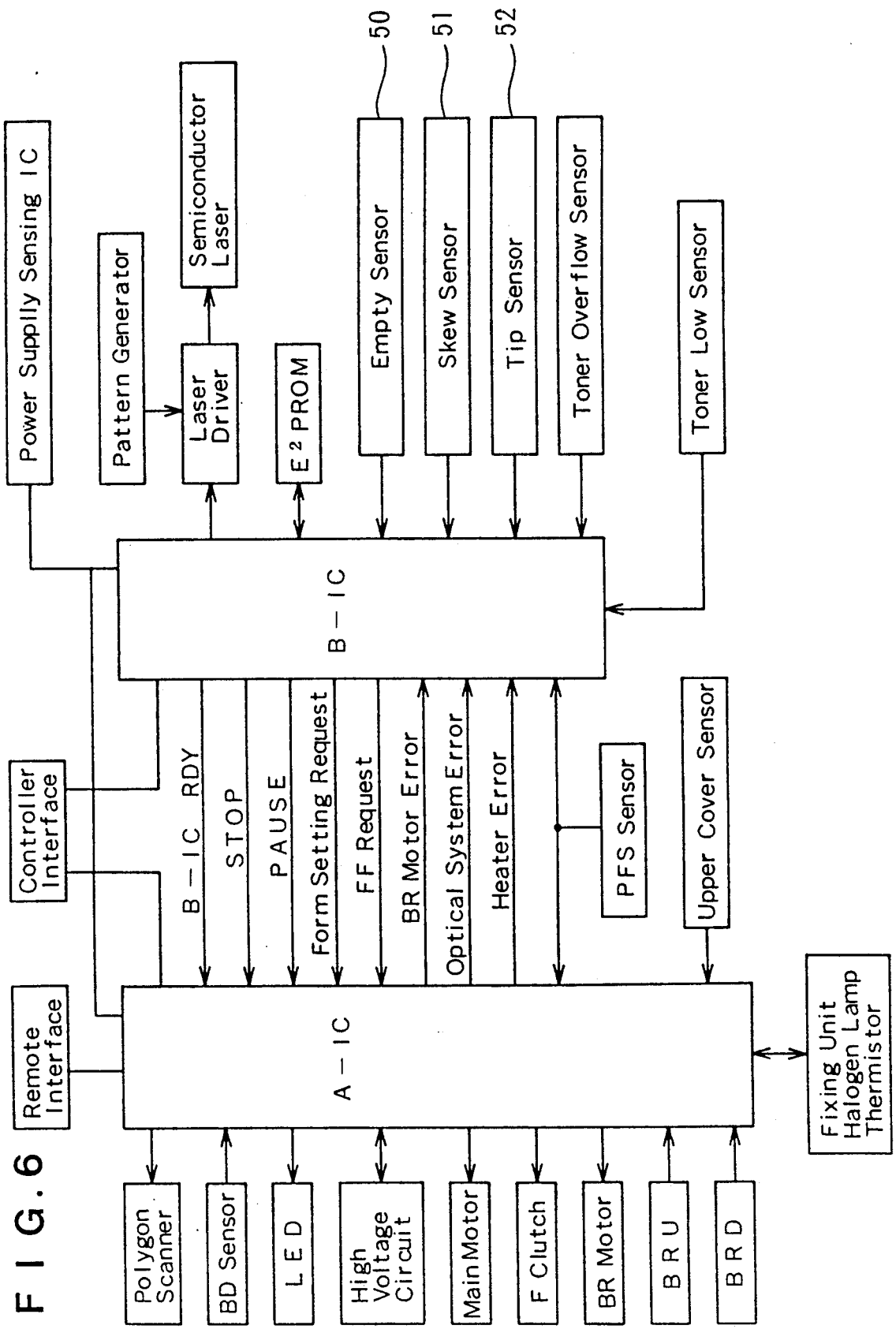
FIG. 6 is a block diagram of a control system for the printer of the embodiment of the present invention.

FIG. 6 shows a control circuit of the printer. This circuit is provided with an A-IC CPU which carries out a control of the printing process, and a B-IC CPU which carries out error detections. A remote interface for a remote control for external devices, and a power supply sensing IC for checking a supply of power to both CPUs, are connected to the CPUs.

The A-IC is connected to an interface for a controller receiving printing information from the host computer. Further, the A-IC is connected to controlled objects, such as a polygon scanner for rotating the polygon mirror 13a of the scanning system, the LED 17 provided at the transfer unit 10, a high voltage circuit connected to, for example, the charger 12, to which a bias voltage is supplied, the main motor 40, the F clutch, the BR motor 60, and the halogen lamp provided in the heat roller 31.

Information is inputted to the A-IC by a BD sensor, which outputs a horizontal synchronizing signal of the scanning optical system, the BRU sensor and a BRD sensor for sensing a position of the press roller 32, the thermistor for sensing a temperature of the heat roller, an upper cover sensor for sensing an open and closed state of the upper cover, and the PFS sensor.

The BD sensor comprises a photodetector which is optically equivalent to the sensitive drum 11 in the scanning system, and is provided upstream of the sensing drum 11 along the scanning direction of the beam. Note that such a photodetector is usually called a BD sensor, and thus this terminology is used in this specification. Further, an output signal from this sensor is called a BD signal.

A laser driven operates a semiconductor laser of the scanning system and an $E^2PROM$ stores information on which of the parts of the printer are connected to the B-IC. A pattern generator storing printing information for a self-printing test is connected to the laser driver. The semiconductor laser is provided with a detector receiving a beam returned to the side opposite to that from which the beam is radiated for printing, so that the laser driver can carry out an automatic power control (APC) by a feedback control to the semiconductor laser in accordance with a signal outputted from the laser driver.

Information is inputted to the B-IC by the empty sensor 50, the skew sensor 51 and the tip sensor 52, as sensors relating to the form feeding, and by a toner overflow sensor (an error detecting means) showing the amount of toner used and a toner low sensor (an error detecting means) warning of a lack of toner, as sensors related to a toner in the transfer unit 10.

The A-IC and the B-IC are constructed in such a manner that the input and output of information between the A-IC and the B-IC are carried out through a plurality of signal lines, to control the printer. FIG. 6 shows the main parts of these signal lines.

The signals transmitted from the B-IC to the A-IC include a B-IC RDY signal showing that the B-IC is ready, a STOP signal for immediately stopping an operation of each part, even during the printing process, when a very serious error occurs, a PAUSE signal for stopping an operation of each part after a predetermined operation when a less serious error occurs, a form setting request signal output when the tip of the continuous form does not reach the tip sensor, and an FF (form feed) request signal for carrying out a discharge of one page of the continuous form FP.

The signals transmitted from the A-IC to the B-IC include error signals for the BR motor, the scanning optical system and the heater in the fixing unit. The B-IC analyses an error sensed by the B-IC and an error signal transmitted from the A-IC to judge the seriousness (priority) of the error based on predetermined criteria, and then selects the STOP signal or the PAUSE signal in accordance with the seriousness of the error and transmits the signal to the A-IC. The A-IC also functions as an error detecting means for detecting serious errors. Note that less serious errors are those for which signals indicating a toner overflow warning, a toner low warning, and an end of the continuous form warning are input, and all other errors are dealt with as very serious.

The operations of the printer are described below with reference to the flow charts shown in FIGS. 7 through 19, which are mainly programs of the A-IC.

FIGS. 7 through 10 show a main flow chart of a basic operation of the printer, and other routines are branched off from the main routine shown in the main flow chart, or are carried out when required in the main routine.

Note that the supply of each bias voltage for charging, developing, transfer, and cleaning is shown as an M bias, D bias, T bias, and C bias, respectively, in the flow chart. When a bias voltage for starting the printer is supplied, the M bias, D bias, T bias, and C bias are sequentially supplied at a predetermined timing in synchronization with a rotation of the sensitive drum 11.

When a power supply is input, the A-IC initializes the registers in STEP 001, and starts a control timer in STEP 002. The control timer is used in an interrupt routine described later, or used for defining a width of a drive pulse of the main motor 40.

Note that two kind of clocks for 1.2 μs and 38.4 μs can be used in the A-IC, and when a correction of the feeding of the continuous form is not allowed, as described later, the control timer counts a clock signal of 38.4 μs for 26 times to define 1 ms with a relatively low accuracy. The clock count of 38.4 μs is is started in STEP 002.

Then, in STEP 003, the A-IC determines whether or not a remote controller is connected and in STEP 004, whether or not the upper cover is open. If the remote controller is connected, the process goes to a remote routine, and if the upper cover is open, the process goes to a cover open routine.

Figure 11:
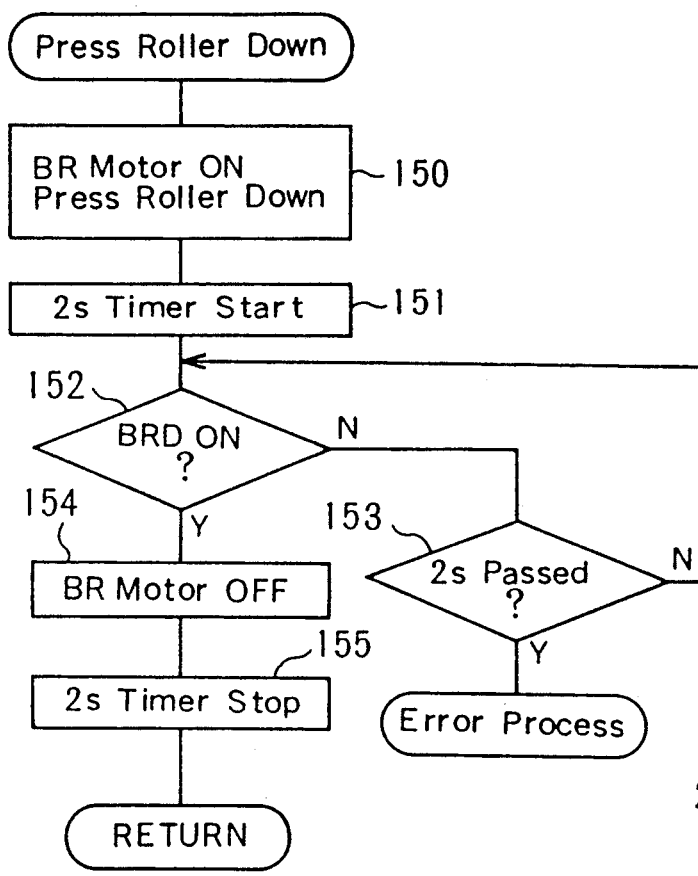
FIG. 11 is a flow chart of a press roller down routine.

If the remote controller is not connected and the upper cover is not open, the process goes to STEP 005, in which a state of the BRU is sensed. If the BRU signal is an ON signal, i.e., if the press roller 32 is in the up position, a press roller down routine, shown in FIG. 11, is requested in STEP 006, and the press roller 32 is moved down. This state may occur when the power supply is cut during a printing process so that the press roller is left at the up position. The process for moving the press roller down is carried out to prevent a burning of the continuous form when the heater is turned ON at the start of the next printing process.

In the press roller down routine shown in FIG. 11, in STEP 150 the BR motor is driven in a direction in which the press roller 32 is moved down, and in STEP 151, a 2 second timer is started. Before the operation of the 2 second timer is completed, it is determined in STEP 152 and 153 whether or not the BRD signal has become an ON signal. If the BRD signal has not become an ON signal within 2 seconds, the process goes to an error processing routine. Conversely, if the BRD signal has become an ON signal within 2 seconds, the process goes to STEP 154, in which the BR motor is stopped, and then goes to STEP 155 in which the timer is stopped, and the process returns to STEP 007 in FIG. 7. Note that, in the error processing routine, the kind of error that has occurred is indicated, and the power supplies for the motor and heater are turned OFF, whereby the operation of the printer is stopped.

Figure 7A:
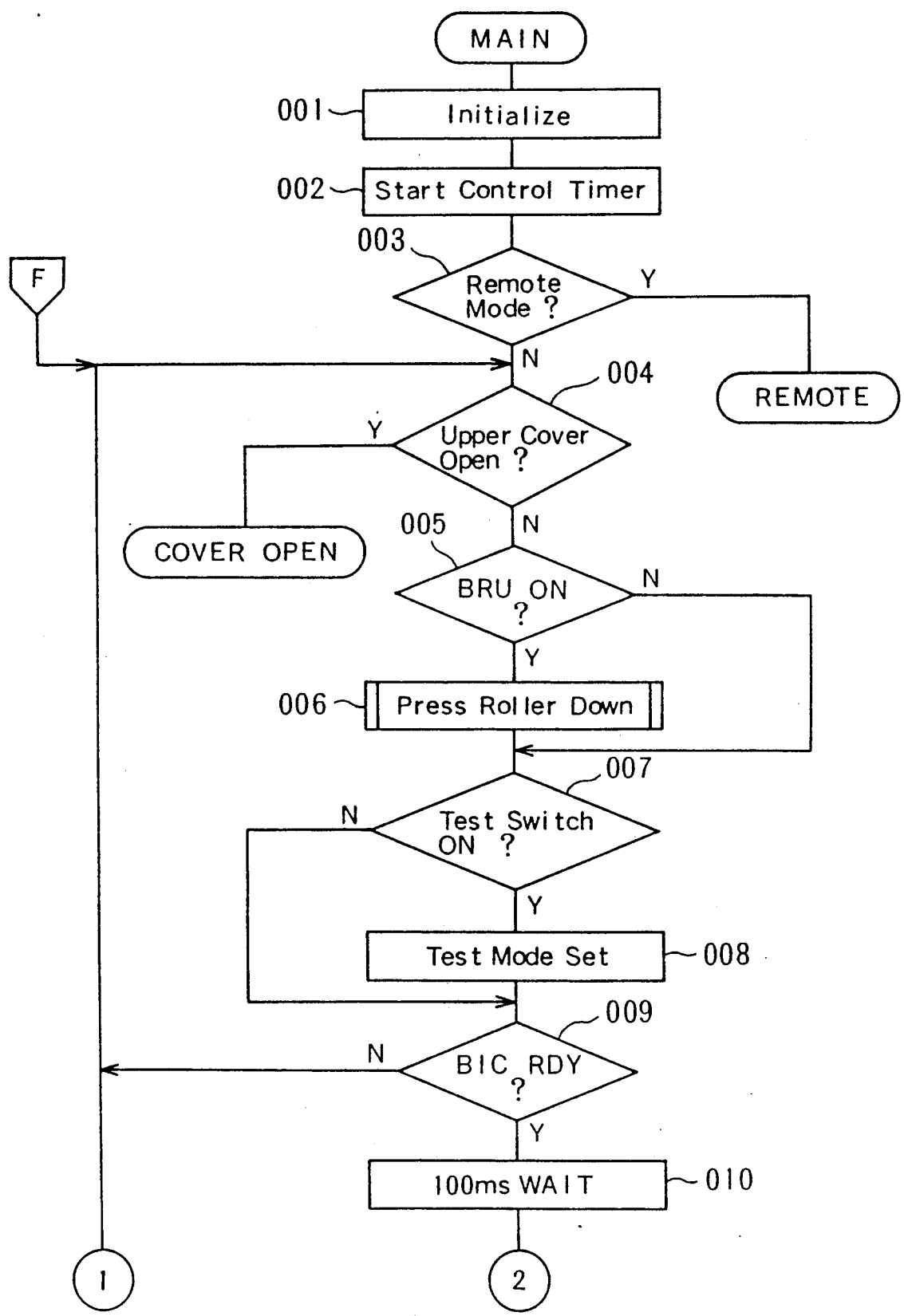
Figure 7B:
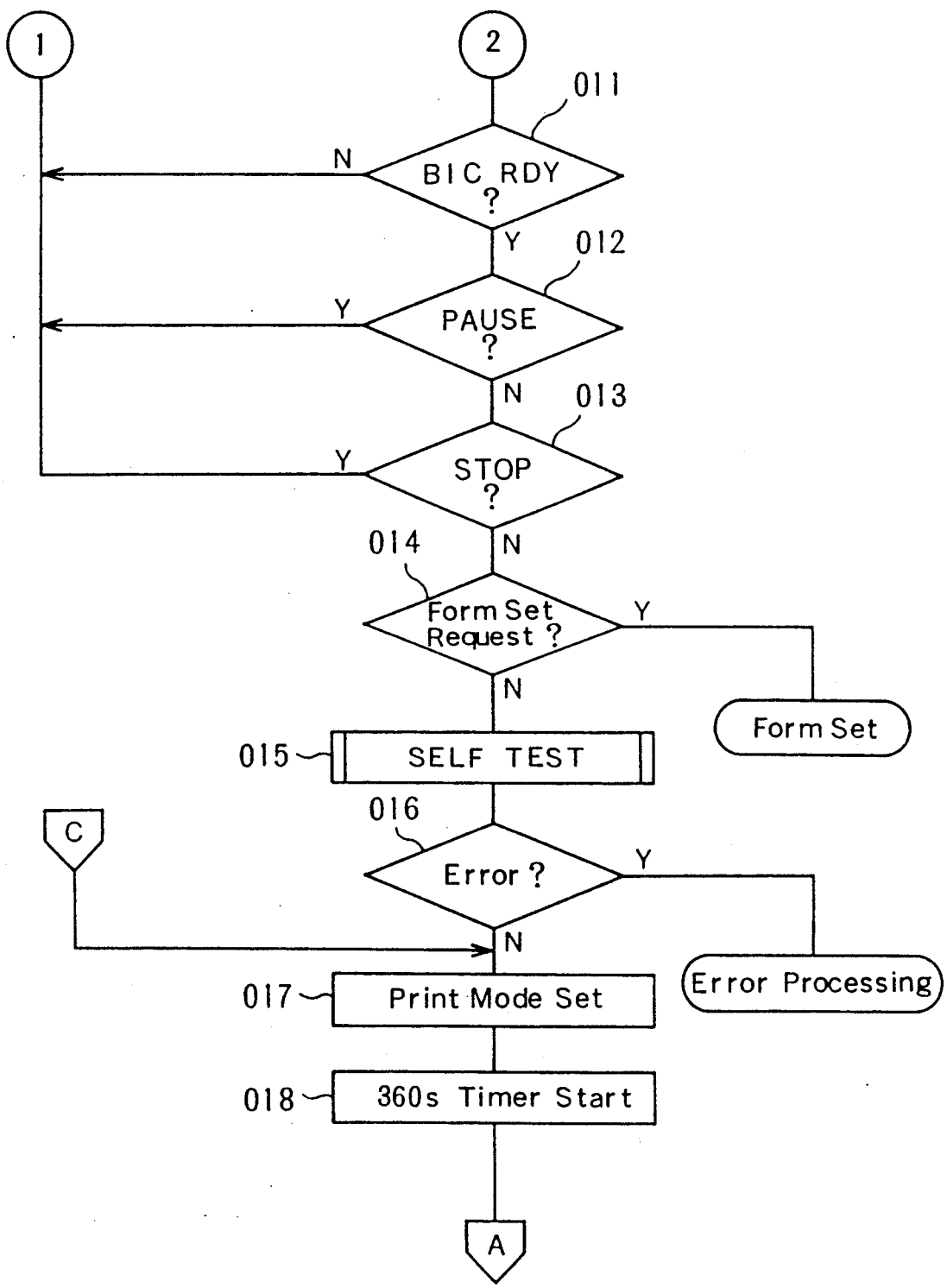

Then, in STEPS 007 and 008 in FIG. 7, it is determined whether or not a test switch of the printer is turned ON, and if the test switch is turned ON, a test mode is set so that the B-IC ignores all error information except for that relevant to a form feeding for the test.

In STEPS 009 through 011, it is twice determined, at STEP 009 and at STEP 011, whether or not the B-IC is ready (B-IC RDY), with an interval of 100 ms therebetween imposed in STEP 010. If the B-IC is not ready, the process returns to STEP 004, and STEPS 004 through 011 are repeated until the B-IC is ready. If the B-IC is ready, the process goes to STEP 012. In STEPS 012 and 013, it is determined whether or not a STOP or PAUSE signal has been input from the B-IC. If the STOP or PAUSE signal has been input to the A-IC, the process returns to STEP 004, and STEPS 004 through 013 are repeated until it is determined that the STOP or PAUSE signal has not been input.

In STEP 014, it is determined whether or not a signal requesting the continuous form to be set has been output from the B-IC. This signal is outputted when the tip of the continuous form does not reach the tip sensor 52. When the continuous form is requested to be set, the process branches off from STEP 014 to go to a form setting routine shown in FIG. 12.

Figure 12A:
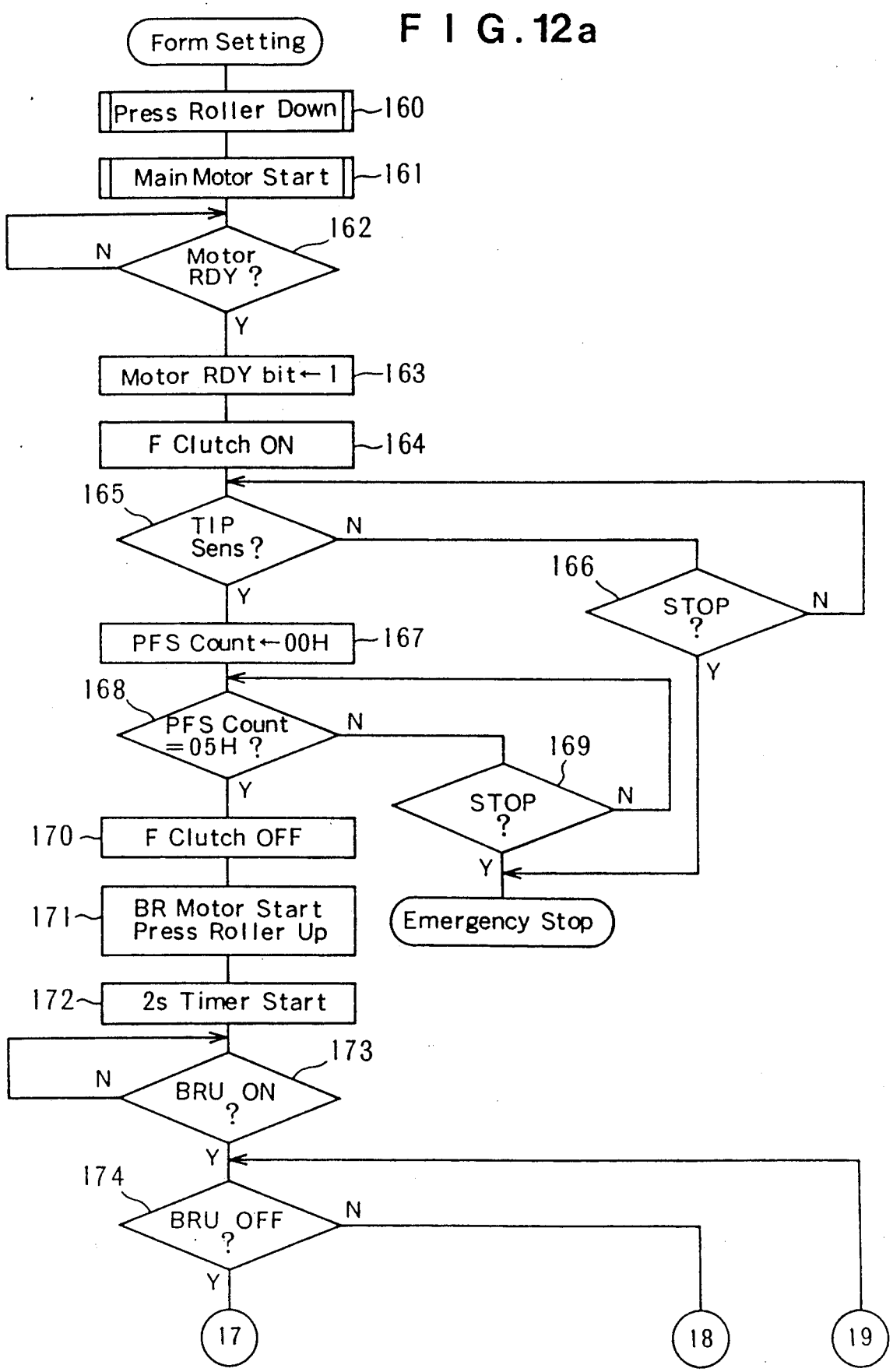
FIGS. 12a and 12b illustrate a flow chart of a form setting routine.
Figure 12B:
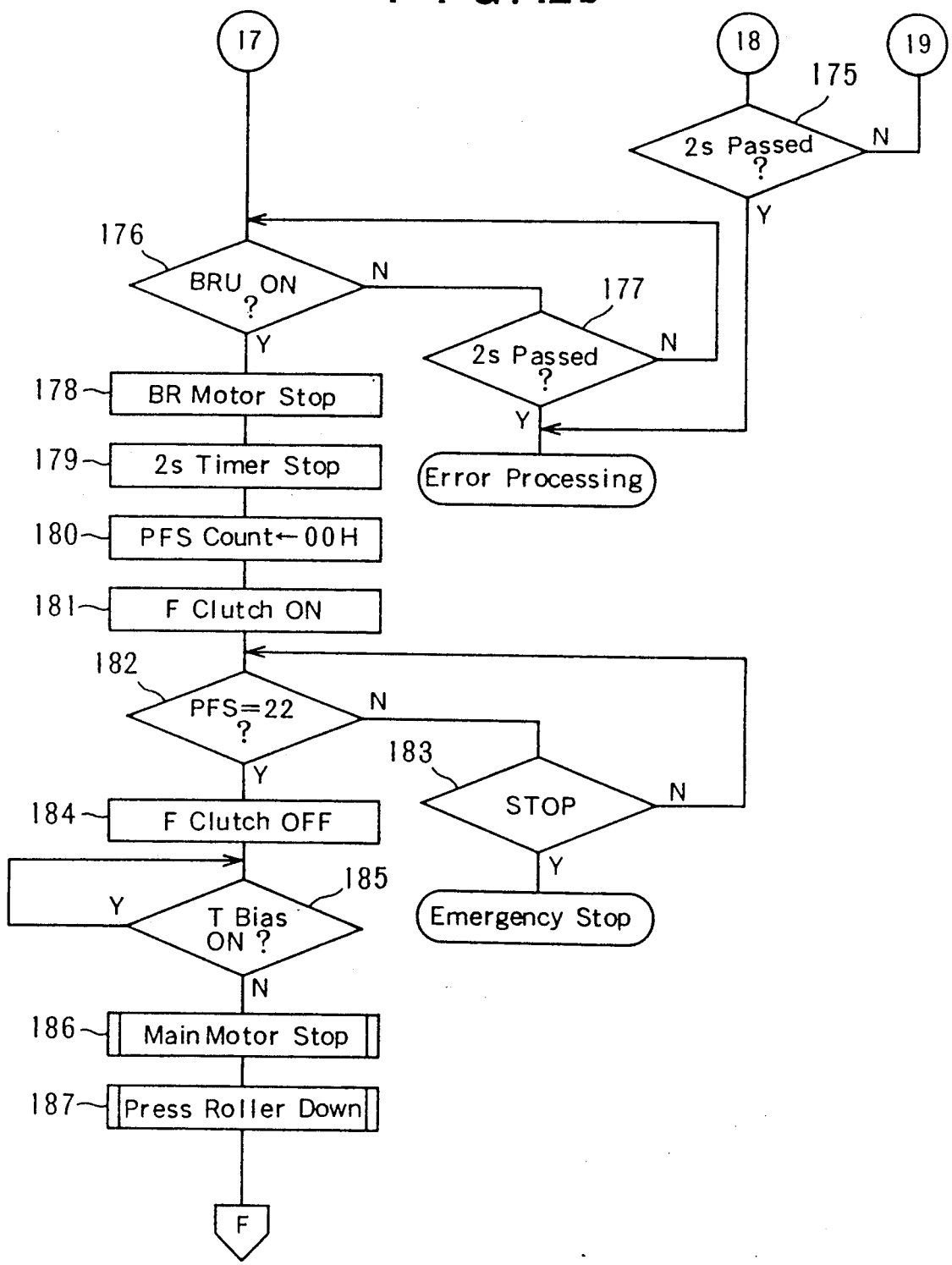

In the form setting routine shown in FIG. 12, the press roller down routine shown in FIG. 11 is carried out in STEP 160, and a main motor start routine is requested in STEP 161.

Figure 13:
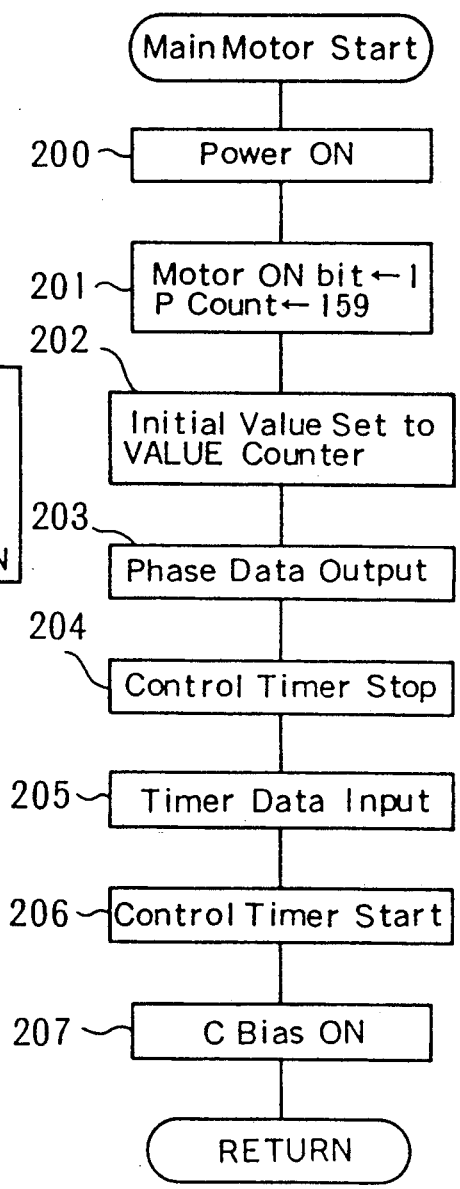
FIG. 13 is a flow chart of a main motor routine.
Figure 18A:
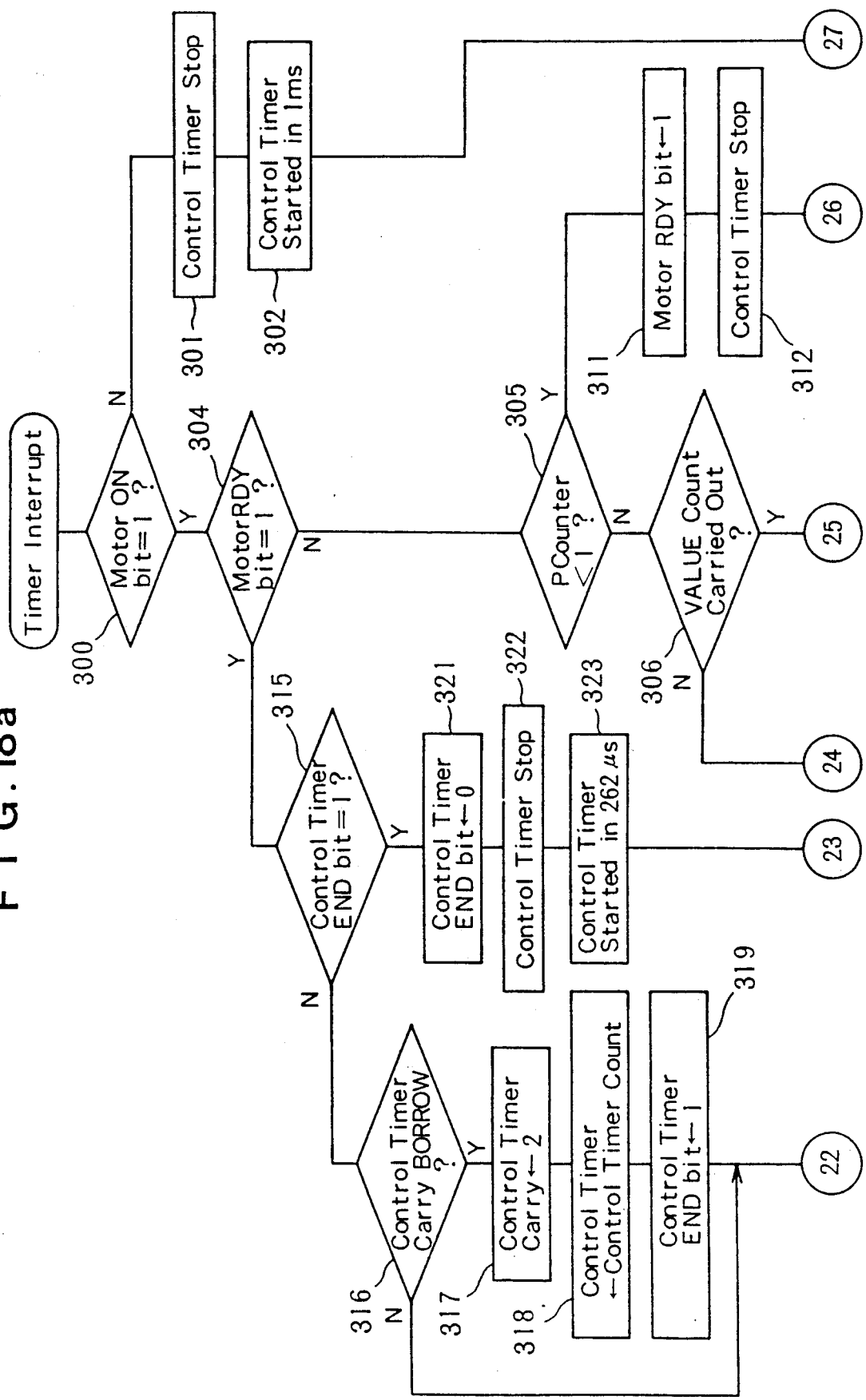
FIGS. 18a and 18b illustrate a flow chart of a timer interrupt routine.
Figure 18B:
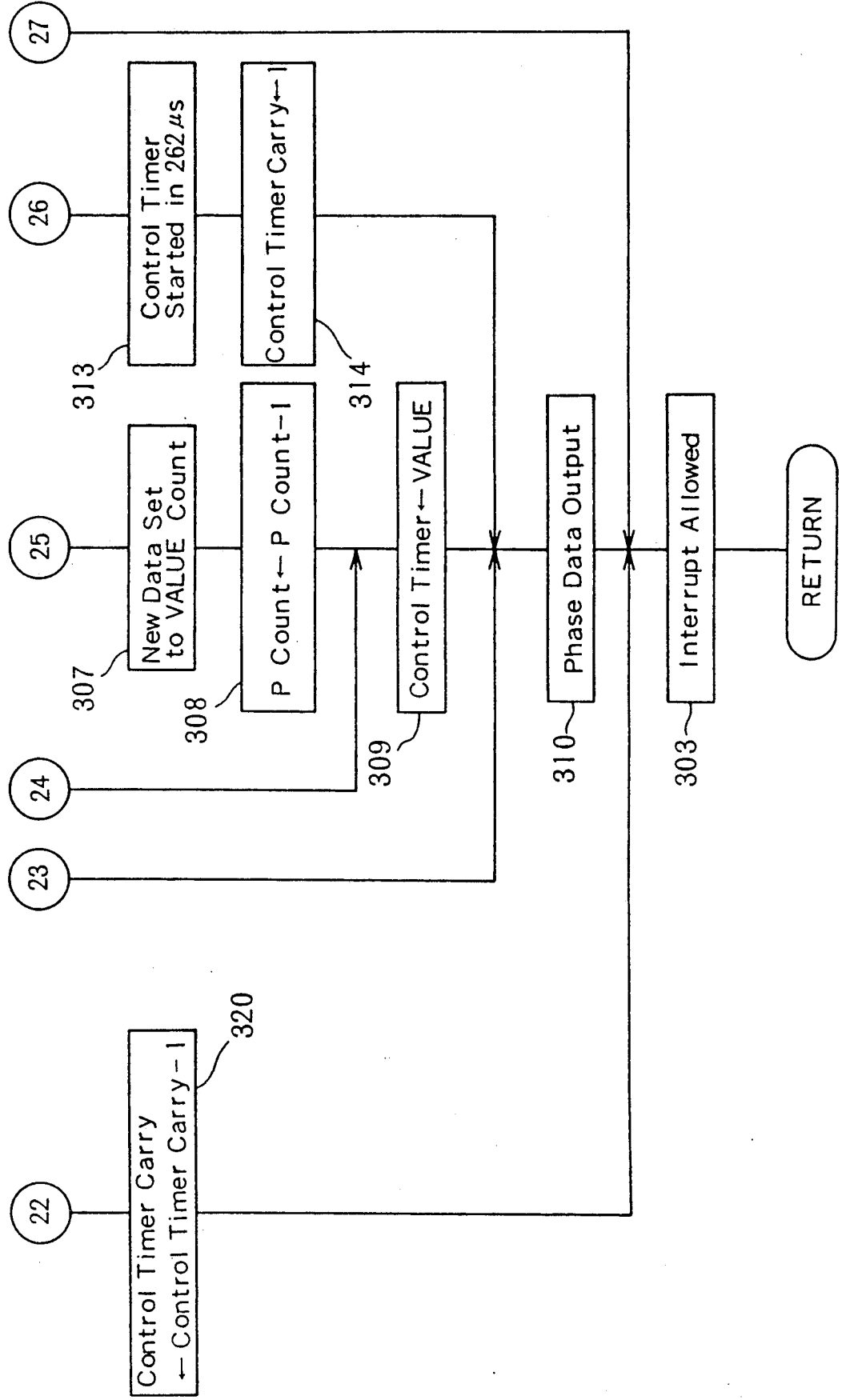

In the main motor start routine, as shown in FIG. 13, a power supply is switched ON in STEP 200, and a motor ON bit is set to "1" and a P counter is set to "159" in STEP 201. Then, an initial value is set to a VALUE counter in STEP 202. The P counter is used in a timer interrupt routine described later to set data for starting the motor so that a rotation of the main motor 40 is accelerated from a slow speed to a high speed. The VALUE counter is a counter to which data corresponding to a frequency of the actual drive pulse when starting the main motor 40 is set. An acceleration process of the main motor 40 is described later with reference to FIG. 18, showing the timer interrupt routine.

In STEP 203, phase data of a drive pulse for the main motor is outputted in accordance with data set in the VALUE counter. The control timer is stopped in STEP 204, and then timer data set in the timer interrupt routine is input in STEP 205, and the control timer is started again with the set value in STEP 206. Finally, the C bias is turned ON in STEP 207, and the process returns to a step at which the main motor start routine is carried out, i.e., in this case, STEP 162 shown in FIG. 12.

If it is determined in STEP 162 that a rotation of the main motor has reached a predetermined value, a motor RDY bit is set to "1" in STEP 163 and then the F clutch is connected in STEP 164, so that the heat roller 31 and the tractor unit 20 are rotated and the feeding of the continuous form FP is started.

Then, in STEPS 165 through 169, the process waits until the form is fed by 5 PFS pulses from an input of a signal by the tip sensor 52. Namely, if it is determined that the tip sensor 52 has sensed the tip position of the continuous form in STEP 165, a PFS count is set to "00H" in STEP 167, and it is determined whether or not the PFS count has reached "05H" in STEP 168. If it is determined that the PFS count has reached "05H" in STEP 168, the process goes to STEP 170. Accordingly, when the form is fed by 5 pulses, i.e., 2.5 inches, after a signal has been input from the tip sensor 52, the tip portion of the continuous form is engaged with the rollers of the fixing unit 30, and a perforated portion, which is a boundary between two adjacent pages, is positioned immediately under the sensitive drum 11. Note that the PFS count is carried out in a PFS interrupt routine described later.

Figure 14:
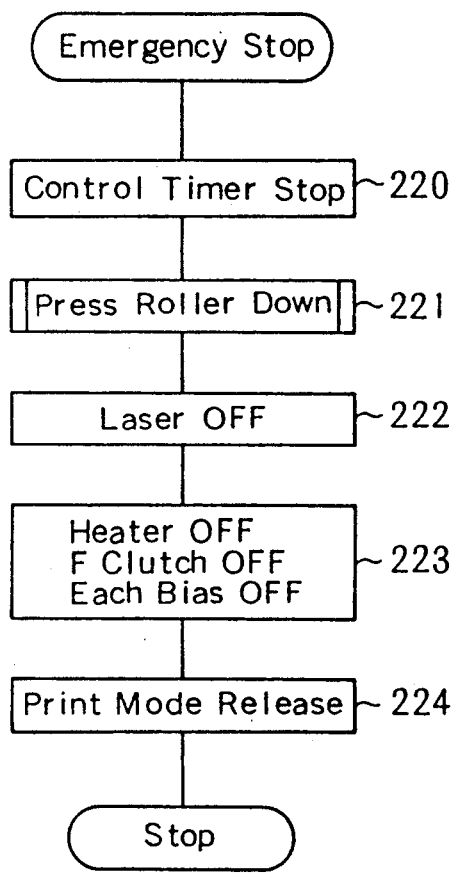
FIG. 14 is a flow chart of an emergency stop routine.

In STEPS 165 through 169, it is also determined whether or not a STOP signal has been outputted by the B-IC, and if the STOP signal is output before the continuous form is fed by 5 pulses after sensing the tip position of the continuous form, the process goes to an emergency stop routine shown in FIG. 14.

In the emergency stop routine shown in FIG. 14, in STEP 220, the control timer is stopped so that the timer interrupt is prohibited, and after the press roller down routine shown in FIG. 11 is carried out in STEP 221, an output of the semiconductor laser is stopped in STEP 222. Then, in STEP 223, the heater in the heat roller 31 is turned OFF, and the bias voltages for the F clutch and the transfer unit 10 are shut off, respectively, and in STEP 224, the print mode is released and the printing process is ended.

Thus, when a high priority error occurs, the printing and fixing processes are immediately stopped when an error is detected.

Note that the emergency stop routine is carried out in accordance with a STOP signal from the B-IC, and is different from the error processing routine carried out in accordance with a judgement of the A-IC. The emergency stop is carried out in a case in which the printer can be restarted after attending to, for example, insertion of a fresh continuous form, or clearing a form jam. Conversely, the error processing routine is carried out when the printer is subject to serious damage, such as a breakdown of a heater or a motor, and must be returned to the maker for repair.

Returning to FIG. 12, if a STOP signal is not inputted during the sensing of 5 pulses by the PFS, the process goes to STEP 170, in which the F clutch is shut off.

At this time, due to the process carried out in STEPS 165 through 170, the tip portion of the continuous form is positioned at the rollers of the fixing unit 10. Therefore, when printing is started, the form is sandwiched between the rollers, and the feeding of the continuous form FP is started. As described above, the heat roller 31 is kept at a high temperature while waiting for the next printing operation to start, and accordingly, if the end portion of the continuous form is positioned near the heat roller, if the form is not gripped by the rollers the end portion of the form is curled by the heat from the heater, and as a result, when the press roller 32 is moved up to start a feeding of the continuous form, the tip of the continuous form is not properly fed between the rollers, and a paper jam occurs.

To avoid such a problem in this printer, one page of the continuous form is discharged from the printer by a process carried out in STEPS 171 through 184, described below.

First, the press roller 32 is moved up to sandwich the form together with the heat roller 31 in STEPS 171 through 179.

In this process, the BR motor is rotated in a direction in which the press roller 32 is moved up in STEP 171, and a 2 seconds timer is started in STEP 172. Then, before the operation of the 2 seconds timer is completed, it is determined whether or not the press roller 32 is set to a predetermined position. Then, in STEP 173, it is determined whether or not a first BRU signal has been output, i.e., whether or not the first slit 70a (FIG. 5(A)) is at the photocoupler 72. If the first BRU signal has been outputted, the process goes to STEP 174, which is repeated for 2 seconds. If the BRU signal disappears during this 2 seconds period, the process goes to STEP 176, in which it is determined whether or not a second BRU signal has been output. The second BRU signal corresponds to the second slit 70b (FIG. 5(A)), and an output of the second BRU signal means that the press roller 32 has been moved up to the predetermined position thereof.

If the BRU signal has not changed during the 2 seconds period in STEPS 174 and 176, it is determined that the BR motor has failed, and the error processing routine is carried out.

If the press roller 32 is moved up during the 2 seconds period, the BR motor is stopped in STEP 178, and the 2 seconds timer is stopped in STEP 179. Then, a process by which one page of the continuous form is discharged is carried out as described below.

In STEPS 180 and 181, a counter counting the PFS is cleared, and the F clutch is connected to start the feeding of the continuous form. This printer is constructed in such a manner that the continuous form is fed by one page having a length of 11 inches. Note, the number of PFS pulses corresponding to one page is 22.

Accordingly, while it is determined whether or not the STOP signal has been outputted from the B-IC, in STEP 183, it is also determined whether or not the PFS pulses have been sensed 22 times in STEP 182. If 22 PFS pulses have been sensed, the F clutch is disconnected in STEP 184 to stop the feeding of the continuous form. By this process, the first page of the continuous form is discharged from the outlet of the printer, whereby a boundary between the first page and the second page is positioned at the fixing unit 30, and a boundary between the second page and the third page is positioned immediately under the sensitive drum 11.

In STEP 185, the process waits until the T bias is turned OFF, and when the T bias is turned OFF, a main motor stop routine is carried out in STEP 186 to stop the main motor. Then the press roller is moved down in STEP 187, so that a pressure on the continuous form exerted by the heat roller is released. Thereafter, the process goes to STEP 004 in FIG. 7.

Figure 15:
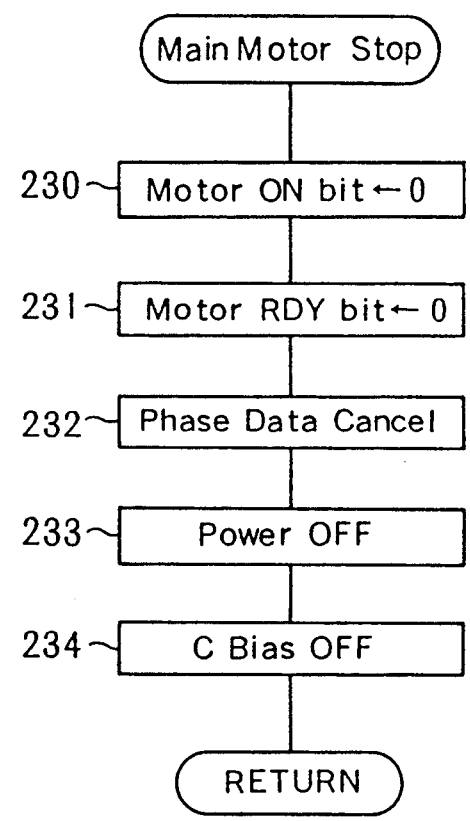
FIG. 15 is a flow chart of a main motor stopping routine.

The main motor stop routine is carried out as shown in FIG. 15. That is, in STEPS 230 and 231, a motor ON bit and a motor RDY bit are cleared to "0", respectively, and phase data for driving the motor is cancelled in STEP 232. Then a power supply for the motor is turned·OFF in STEP 233, and the C bias is turned OFF in STEP 234, and the process returns to the routine at which this main motor stop routine was requested.

Returning to FIG. 7, the main routine is again described below.

When, as a result of carrying out the continuous form setting routine, a request for the form to be set is not received at STEP 014, the self test routine is carried out in STEP 015. In this routine, if an error is detected, the process branches off from STEP 016 to the error processing routine. Note that this self test routine is used at a start of a usual printer operation.

Currently, a printer having a self-diagnosis function is known, but in a conventional self-diagnosis, when one error is detected the diagnosis is ended, and an error processing routine then carried out. In such a construction, if a plurality of errors occur at the same time, even if the error detected by the diagnosis is corrected, other errors are not detected, and these other errors can not be detected unless the diagnosis is again carried out.

In the printer of this embodiment, however, even if an error is detected, all of the remaining check items are checked, and thus a plurality of errors can be detected by this error processing routine.

Figure 16B:
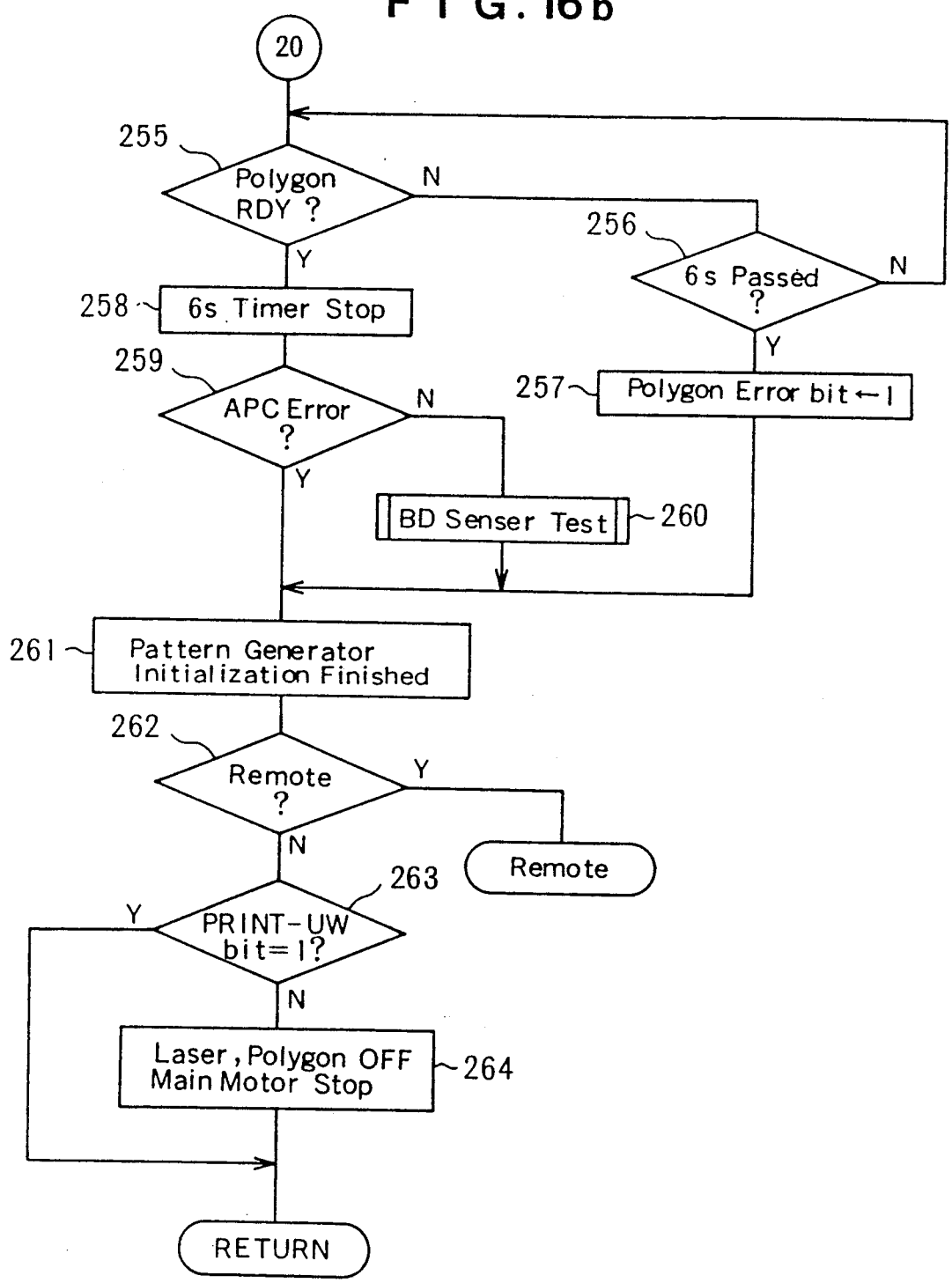

As shown in FIG. 16, in the self test routine, it is determined whether or not a resistance of the thermistor in the heat roller is higher than a resistance RO corresponding to an assumed lowest room temperature (for example, 0° C.). A resistance value of a thermistor becomes larger in accordance with a lowering of a temperature, and therefore, if the resistance value of the thermistor is higher than the resistance RO corresponding to the assumed lowest room temperature, the A-IC determines that the thermistor is disconnected, a heater error bit is set to "1" in STEP 241, and the process goes to the next test.

If it is not determined that the thermistor is disconnected, a 120 seconds timer is started in STEP 242, and the heater is turned ON in STEP 243. In STEP 244, it is determined whether or not the resistance of the thermistor is lower than a resistance value RL corresponding to a lower setting temperature (for example, 100° C.).

When a power supply to a printer is ON, in principle, the heater is heated as a preheating step. In the printer of this embodiment, the heating temperature is controlled in two steps. Namely, as described later, when a printing process is not carried out for more than 6 minutes, although the power supply is turned ON, the heating temperature is set to a lower temperature of 100° C., and when a printing process is started, the heating temperature is set to a higher temperature of 185° C. Accordingly, an influence of heat on the continuous form in the printer is avoided.

When the temperature of the heat roller is lower than the lower setting temperature, in STEP 245, the temperature of the heat roller is set to the lower temperature, and in STEP 246, it is determined whether or not 120 seconds has passed, whereby the determination at STEP 244 is repeated for at least 120 seconds. If the temperature of the heat roller becomes higher than the lower temperature, within 120 seconds, a temperature set to the heat roller is changed to a higher temperature in STEP 247, and the next test is carried out. If the temperature of the heat roller does not become higher than the lower temperature after 120 seconds have passed, it is determined that the heater has failed and the process goes to STEP 241.

Note that the temperature of the heat roller is not immediately set to the higher temperature because, if the temperature of the heater is set to the higher temperature immediately after the heater is turned ON, the temperature of the heater will rise to an excessively high level and the fixing unit will be damaged.

If a series of heater tests is finished without the occurrence of errors, a subroutine of a BR motor test is requested in STEP 248. In this subroutine, while sensing the output of BRU and BRD signals, it is determined whether or not the press roller can be moved up and down within 2 seconds.

If an error is detected as a result of the tests, including the test described later, an error bit corresponding to each test is set, and then the process returns to the test routine and the next test is carried out.

The main motor is started in STEP 249, and after it is determined that a motor RDY signal is output in STEP 250, a motor RDY bit is set in STEP 251. In STEP 252, a test of the polygon scanner is begun, and a 6 seconds timer is started. In this test, it is determined whether or not a rotation speed of the polygon mirror has reached a predetermined value within 6 seconds from the start of the rotation thereof.

Then, in STEP 253, it is determined whether or not the automatic power control (APC) to the semiconductor laser is operating correctly. In this test, a signal outputted from a D/A converter provided in the laser driver is changed with regard to the least significant bit, whereby it is determined whether or not an output signal of a return beam has changed in accordance with a change of the least significant bit. If the output of the laser has changed in accordance with the output control of the A/D converter, it is determined that the APC for the semiconductor laser is operating correctly.

In STEP 254, an initialization of a pattern generator used in a self-printing process is started, and in STEPS 255 and 256, it is determined whether or not a rotation speed of the polygon mirror has reached a predetermined value within 6 seconds, by the above-mentioned polygon scanner test. If the rotation speed has not reached the predetermined value within 6 seconds, the process goes to STEP 257, in which a polygon scanner error bit is set, and then goes to STEP 261. Conversely, if the rotation speed of the polygon mirror has reached the predetermined value within 6 seconds, the timer is stopped in STEP 258, and in STEP 259, it is determined whether or not an error has occurred at the APC. If the APC is operating correctly, a test of a BD sensor is carried out in STEP 260, and the process then goes to STEP 261. Conversely, if an APC error has occurred, STEP 260 is skipped and the process goes directly to STEP 261.

In the test of the BD sensor, the laser is turned ON, and it is determined whether or not a predetermined number of horizontal synchronized signals have been outputted from the BD sensor within a predetermined time. If an error has occurred at the laser or polygon mirror, this test can not be carried out, and in such a case, the test is omitted.

In STEP 261, the initialization of the pattern generator is completed, and if the self test routine is then required in a remote routine, the process goes to the remote routine from STEP 262. Conversely, if the self-test routine is not requested in the remote routine, the process goes to STEP 263, in which it is determined whether or not the self test routine is requested in a printing sequence (STEP 034 in FIG. 8). If the self-test routine is requested as in STEP 015 of FIG. 7, the process goes from STEP 263 to STEP 264, in which the laser, the polygon mirror and the main motor are stopped, and then the process returns to the routine at which this sub-routine was requested. If the self-test routine is requested in the printing sequence as a self test, the process skips STEP 264, and returns to the routine at which this sub-routine was requested.

Accordingly, when the self test is finished, it is determined whether or not an error has been detected in the test, as in STEP 016 shown in FIG. 7, and if an error has occurred, the process goes to the error processing routine. If an error has not occurred, the printer is set to a print mode in STEP 017, a 360 seconds timer is started in STEP 018, and the process goes to STEP 019 shown in FIG. 8a.

In STEPS 019 and 020, the A-IC determines whether or not a PAUSE signal or a STOP signal has been sent from the B-IC. If one of these signals has been input, the print mode is cancelled in STEP 021.

If neither a PAUSE signal nor a STOP signal has been sent, the process goes to STEP 022, in which it is determined whether or not the print mode has been set. If the print mode has not been set, STEP 023 is carried out to set the print mode, and if the print mode has been set, STEP 023 is skipped. In STEP 024, it is determined whether or not a printing process has started and print data for more than one page has been transmitted from the host computer. If the printing process has started, the process goes to the printing sequence described below.

In STEP 025, the 360 second timer, which provides a timing by which the heater is changed to the lower temperature setting, is stopped, and in STEP 026, it is determined whether or not the heat roller is at a high temperature necessary for the fixing. If the heater is set to a low temperature, a 120 seconds timer is started in STEP 027, and the temperature of the heater is set to a high temperature in STEP 028. In STEP 029, it is determined whether or not the temperature of the heater is a predetermined high value. If the temperature of the heater has not reached the predetermined high value in STEP 029, the process goes to STEP 030, in which it is determined whether or not 120 seconds have passed since STEP 027 was carried out. If 120 seconds have not passed, the process returns to STEP 029. Accordingly, if the temperature does not reach the predetermined high value within 120 seconds, the process goes to STEP 031 in which a heater error bit is set, and the error processing routine is then carried out.

In STEP 029, if the heat roller is set to the predetermined high temperature, the timer is stopped in STEP 032 and a PRINT-UW bit is set to in STEP 033. The process goes then to STEP 034, in which the self-test routine shown in FIG. 16 is started from a terminal "SELF TEST 2". If an error is detected in the self-test routine, in STEP 035, it is noted that an error has been detected and thus the process goes to the error processing routine. If an error is not detected in the self-test routine, the process goes from STEP 035 to STEP 036, in which a bias control for the transfer unit 30 is started from the M bias.

After a form feeding correction is allowed in STEP 037, the process waits until the D bias is turned ON in STEP 038. Then, in STEP 039, the BR motor is started and the press roller starts to move up, and in STEP 040, a 2 seconds timer is started, whereby a process for moving the press roller up is carried out as described later.

On the other hand, when a printing process is not allowed to be started in STEPS 019, 020 or 024, then in STEP 042, if 360 seconds have passed since STEP 018, STEP 043 is carried out and the heater is set to a predetermined low temperature. Then in STEPS 044 through 050, it is determined whether or not a test printing is carried out.

In STEP 044, it is determined whether or not a remote mode has been set, and in STEP 045, it is determined whether or not a test switch has been turned ON. In STEP 046, it is determined whether or not a test mode has been set, and if the remote mode has not been set and the test switch has been turned ON, or the test mode has been set, the process goes to STEP 047 and the self print mode is set. Then, in STEP 048, the print mode in which a usual print is carried out is cancelled, and in STEP 049, the test mode is set and the process goes to STEP 025.

If the remote mode and the test mode have not been set, the self print mode is cancelled in STEP 050, and the process goes to STEP 051 in which it is determined whether or not an FF request has been output. If the FF request has been output, the process goes from STEP 051 to an FF processing routine, and thus one page of the continuous form is discharged. Conversely, if the FF request has not been output, in STEP 052, it is determined whether or not a high temperature setting has been requested. If the high temperature setting has not been requested, the process returns to STEP 019, and the process so far is repeated.

As a result of the starting of the main routine to carry out the self test in STEP 015 of FIG. 7, a request for a high temperature setting is carried out in the self test. At the time when STEP 053 is carried out, however, due to an elapse of time, the condition may be transferred to a low temperature setting. Therefore, the heat roller 31 is set to a high temperature in STEPS 054 through 057. Namely, a 120 seconds timer is started in STEP 054, and the temperature of the heater is set to a high temperature in STEP 055. If the temperature of the heater has not reached the predetermined high temperature in STEP 056, STEP 057 is carried out and it is determined whether or not 120 seconds have passed. If 120 seconds have not passed, STEP 056 is repeated. If the heater does not reach the predetermined high temperature within 120 seconds, a heater error bit is set in STEP 059 and the process goes to the error processing routine. In STEP 056, if the heater has reached the predetermined high temperature, the 120 second timer is stopped in STEP 058 and the process goes to STEP 017 in FIG. 7.

Figure 8B:
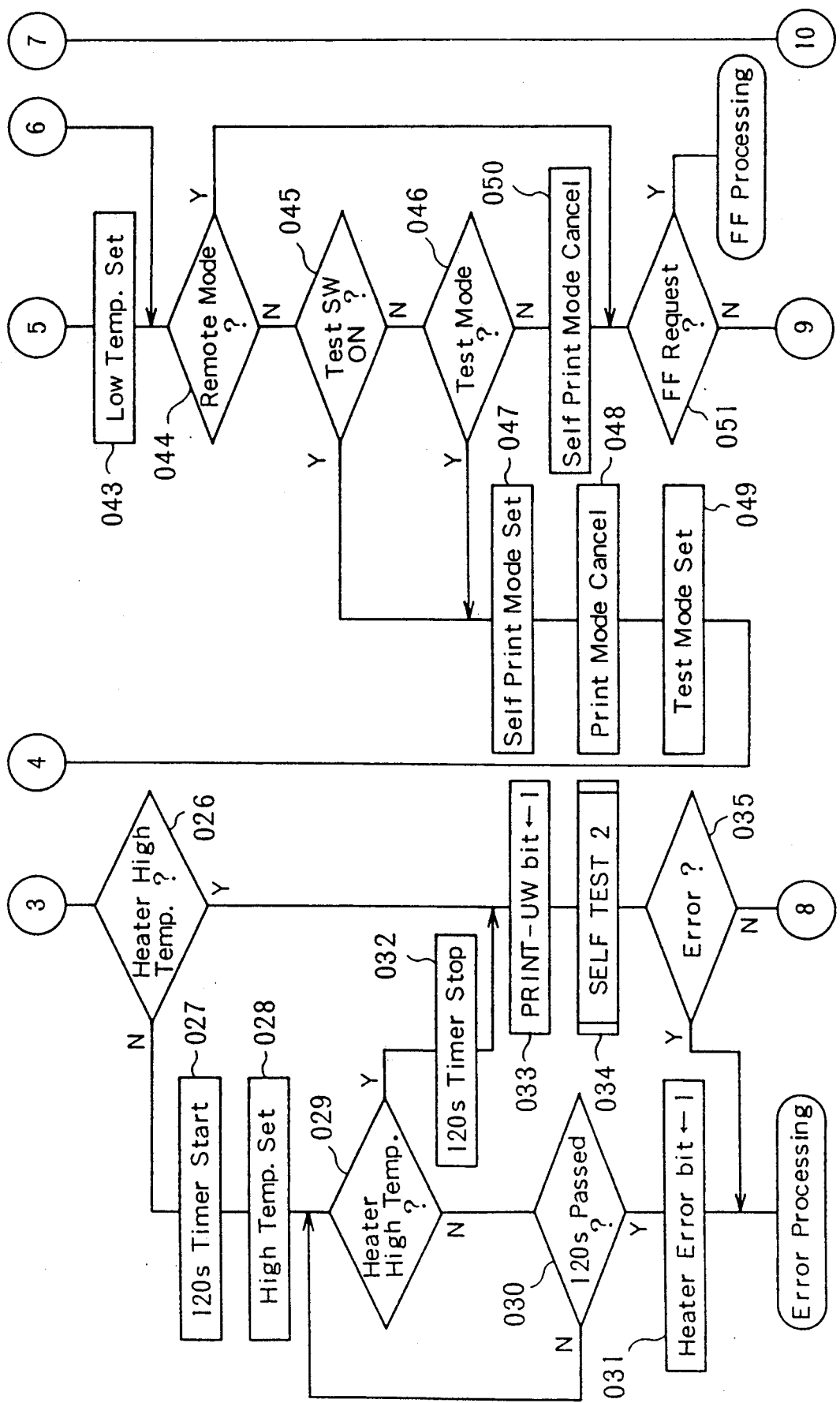
Figure 8C:
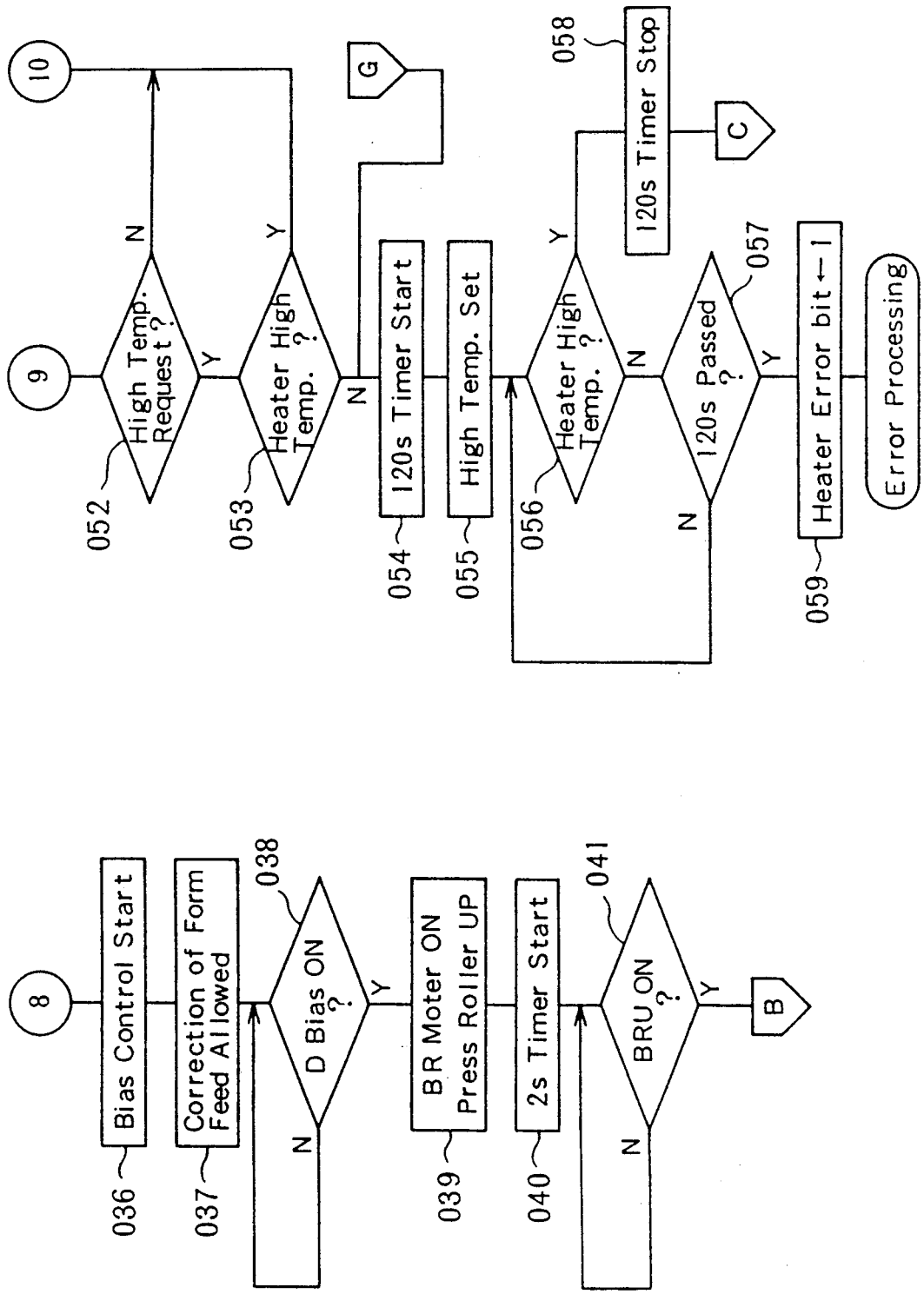

Therefore, until a signal denoting a start of the printing process is input, the A-IC does not carry out the printing sequence by repeating the process shown at the left in FIGS. 8a through 8c.

The A-IC holds the heat roller at the predetermined high temperature until 360 seconds have passed after the timer is set, and carries out a loop processing of STEPS 019 through 024 and STEPS 042 through 053. Then, if 360 seconds have passed, the temperature of the heater is changed to a low temperature setting, and the process goes from STEP 052 to STEP 019. When the process is carried out in this loop, the high temperature setting is not requested, and if it is determined in STEP 024 that a signal for a printing start has been input, or if it is determined in STEP 045 that the test switch is turned ON, the printing sequence starting at STEP 025 is carried out.

Figure 9A:
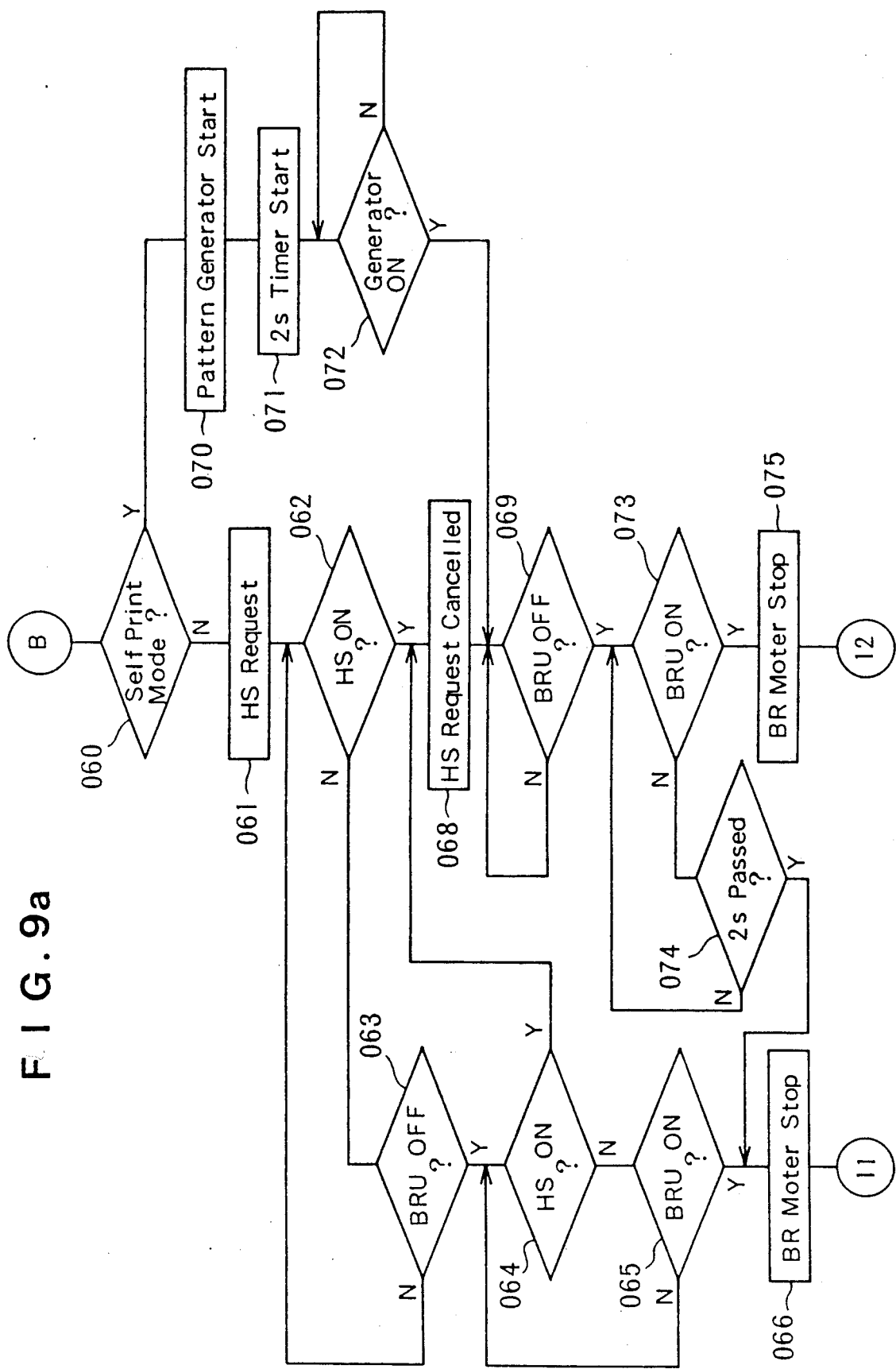

If the BRU signal is outputted first in STEP 041, the process goes to STEP 060 in FIG. 9 to determine whether or not the self-print mode has been set. If the self-print mode has not been set, in STEP 061, a request for an input of a horizontal synchronized signal (HS) is sent, i.e., a request is issued for the start of an exposure process. While the first BRU signal generated in STEP 041 is ON, in STEPS 062 and 063, it is determined whether or not the HS has been inputted. If the HS is not input before the first BRU signal is turned OFF, the process goes from STEP 063 to STEP 064, in which it is again determined whether or not the HS is input. Then, in STEP 065, it is determined whether or not a second BRU signal has been turned ON. If the HS is not inputted before the second BRU signal is turned ON, the process goes from STEP 065 to STEP 066.

Namely, if the HS is not outputted from the BD sensor before the press roller has reached the upper position, it is deemed that an error has occurred in the optical system, and accordingly, the BR motor is stopped in STEP 066, the press roller is moved down in STEP 067, and the process goes to the error processing routine.

If the horizontal synchronized signal is input, the A-IC cancels the HS request in STEP 068, and proceeds to STEP 069.

On the other hand, if the self-print mode has been set, the process goes from STEP 060 to STEP 070, in which the pattern generator is started. Then a 2 seconds timer is started in STEP 071, the process waits until the generator is turned ON in STEP 072, and when the generator is turned ON, the process goes to STEP 069. In the process from STEP 070 to STEP 072, the A-IC receives writing information from the generator without an HS request.

STEP 069 is provided for waiting for the BRU signal to be turned OFF, when the process goes from STEP 062 to STEP 068 without turning OFF the BRU signal. Namely, if the process goes from 064 to STEP 068 after the BRU signal is turned OFF in STEP 063, STEP 069 is substantially omitted.

If the second BRU signal is outputted before the completion of the count of the 2 second timer at STEP 040 in FIG. 8, the process goes from STEP 073 to STEP 075, and the BRU motor is stopped. Conversely, if the second BRU signal is not outputted before 2 seconds have passed, the process goes from STEP 074 to STEP 066, whereby the BR motor is stopped, the press roller is moved down, and the error processing routine is carried out.

When the press motor is moved up so that the form is sandwiched between the rollers, the F clutch is connected in STEP 076 and the rotation of the heat roller and the tractor is started.

Figure 20:
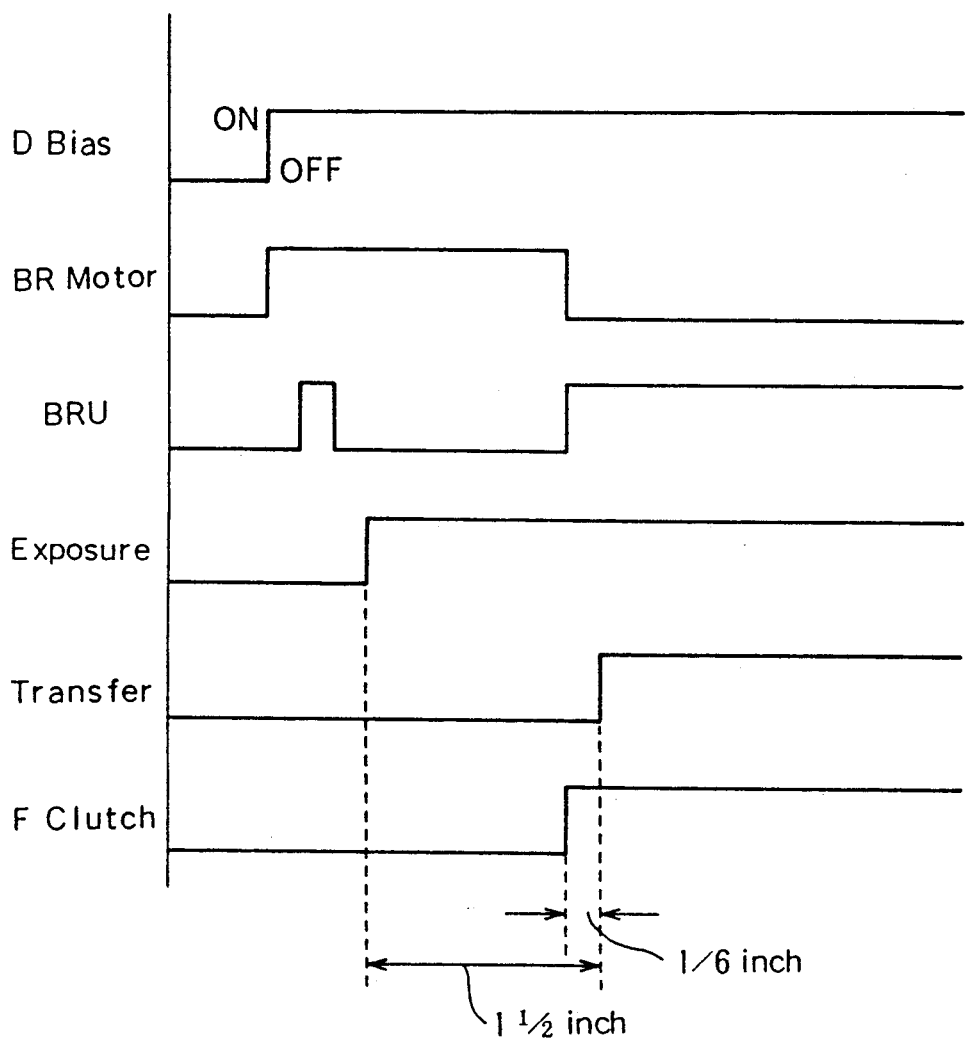
FIG. 20 is a timing chart of a part of a control of the printer of the embodiment of the present invention.

A timing from an exposure to a start of feeding the continuous form is carried out in accordance with a timing chart shown in FIG. 20.

In this drawing, the BR motor is started at the same time as the D bias is turned ON. During the first ON of the BRU signal, or before the BRU signal is again turned ON after once being turned OFF, an exposure is started. Note that, on the sensitive drum, a space between a position at which an exposure is started and a position at which transfer to the continuous form is started is set to one and a half inches in this embodiment. Therefore, before the exposed position reaches the transfer position, the drum must be allowed to run idle so that the continuous form is not fed for one and a half inches.

Note that, if the feeding of the continuous form is started at the same time as a printing portion on the sensitive drum reaches the transfer position, the speed of the continuous-form cannot reach a predetermined value (75 mm/sec) in a short period of time, and thus a difference in the speed of the drum and the speed of the continuous form occurs. As a result, the printed letters are deformed. To avoid this drawback, when the drum runs idle and reaches a position upstream by 1/6 inch before the exposure position of the drum reaches the transfer position, i.e., when the drum is run idle by one and one-third inches from the exposed position, the press roller is returned to the pressing position to sandwich the continuous form with the heat roller, and the continuous form is brought into contact with the sensitive drum. At the same time, the F clutch is connected to start a feeding of the continuous form, and therefore, a space of 1/6 inch from the perforated portion is not printed.

The F clutch may be controlled to be connected in accordance with an elapse of time from a start of the exposure, so that the F clutch ON operation is carried out after the BR motor is stopped.

When the feeding of the continuous form is started, a count of the PFS pulse output at every ½ inch feed of the continuous form is started. In STEPS 077 through 080 of FIG. 9, while taking into account the operation of the 2 second timer controlled in STEP 040 of FIG. 8 and the issue or non-issue of a STOP signal from the B-IC, the process waits for the counted number of PFS pulses to become more than 1. If the counted number of PFS pulses is less than 1 in STEP 077, the process goes to STEP 078 in which, if 2 seconds have passed from STEP 040 of FIG. 8, the process goes to the error processing routine. In STEP 078, if 2 seconds have not passed from STEP 040 of FIG. 8, the process goes to STEP 079 in which, if the STOP signal is input, the process goes to the emergency stop routine. Conversely, if the STOP signal is not input, the process returns to STEP 077. In STEP 077, if the counted number of PFS pulses has become more than 1, the process goes to STEP 080, and the 2 second timer is stopped.

Then, in STEP 081, if the counted number of PFS pulses is not equal to 17, STEP 082 is carried out to determine whether or not the STOP signal has been inputted. If the STOP signal has been input, the process goes to the emergency processing routine, but returns to STEP 081 if the STOP signal has not been inputted. Namely, in STEP 081, if the counted number of PFS pulses is equal to 17, the process goes to STEP 083.

In STEP 083, if the self-print mode is set, the pattern generator is stopped in STEP 084, and in STEP 085, it is determined whether or not the generator has been stopped. If it is determined that the generator has not been stopped in STEP 085, in STEP 086, it is determined whether or not the STOP signal has been inputted. If it is determined that the generator has been stopped in STOP 085, the process goes to STEP 087.

On the other hand, if it is determined in STEP 083 that the usual print mode has been set, the process goes to STEP 087, and it is determined whether or not the STOP signal has been inputted. If the STOP signal has not been input, in STEP 088 it is determined whether or not the PAUSE signal has been inputted from the B-IC. If the PAUSE signal has been inputted, a PAUSE bit is set to "1" in STEP 089, and if the PAUSE signal has not been input, STEP 089 is skipped. Then, in STEP 090, it is determined whether or not the counted number of PFS pulses has reached 18. If this counted number has not reached 18, the process returns to STEP 087. Conversely, if this counted number has reached 18, the process goes to STEP 091 in FIG. 10.

Figure 10A:
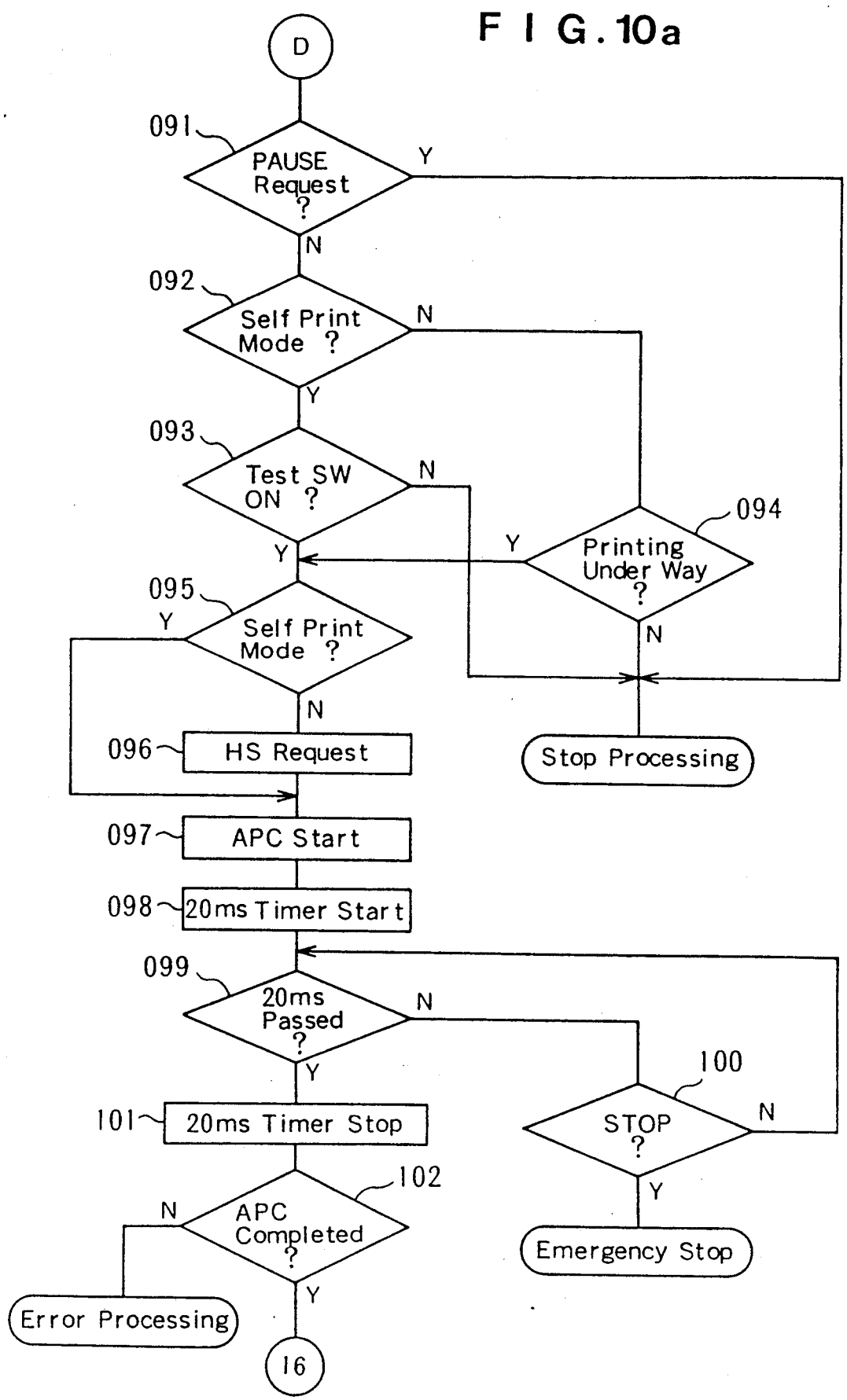
Figure 10B:
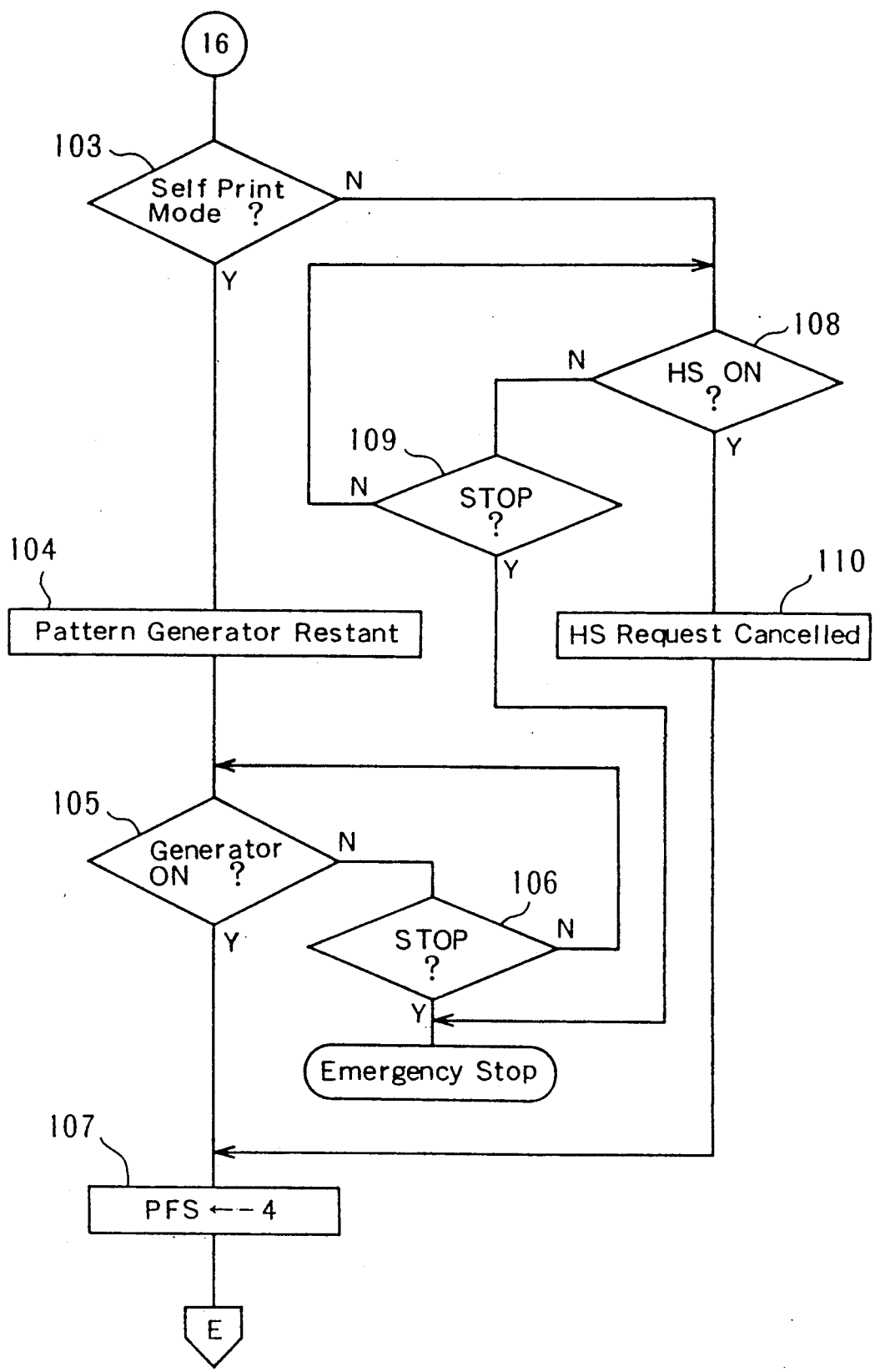

In STEPS 091 through 094 of FIG. 10, it is determined whether or not printing is underway. Namely, if it is determined in STEP 091 that the PAUSE request has been inputted from the B-IC, or if it is determined in STEP 092 that the self-print mode has not been set and it is determined in STEP 094 that a signal denoting that printing is underway has not been input, or it is determined in STEP 093 that the test switch has not been turned ON, the process goes to a stop processing routine shown in FIG. 17. Note that the signal determined in STEP 094 is outputted, for example, when print data in a usual printing mode is less than an amount thereof corresponding to one page.

Accordingly, when the number of PFS pulses becomes 18, i.e., when the continuous form is fed by 9 inches, it is determined whether or not the next page should be printed. This is because, as described above, since the exposure position and the transfer position are at different locations, when the transfer position is 9 inches from a perforated portion, a portion corresponding to 10.5 inches from the perforated portion is located at the exposure position.

Figure 17A:
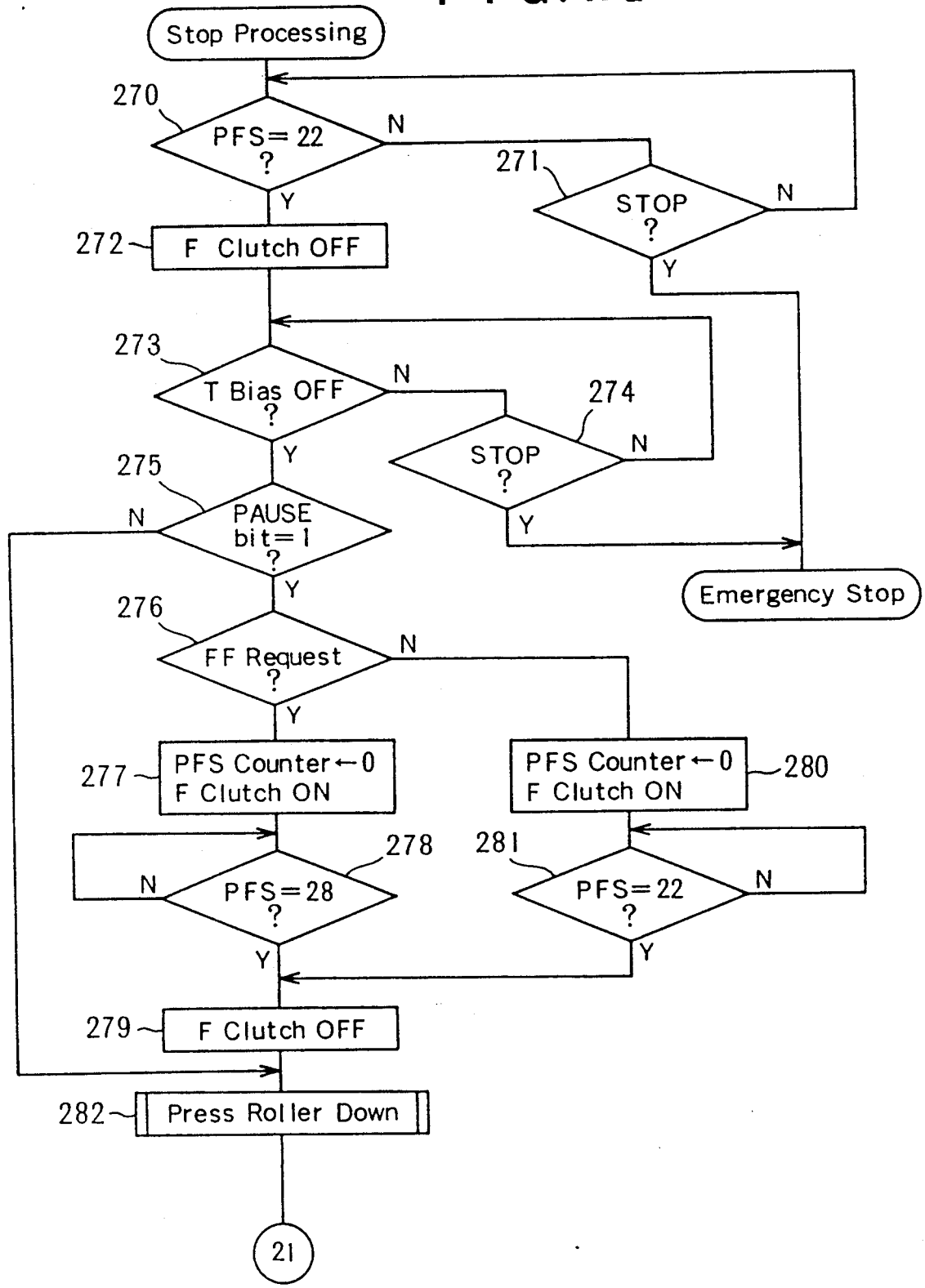
FIGS. 17a and 17b illustrate a flow chart of a stopping process routine.
Figure 17B:
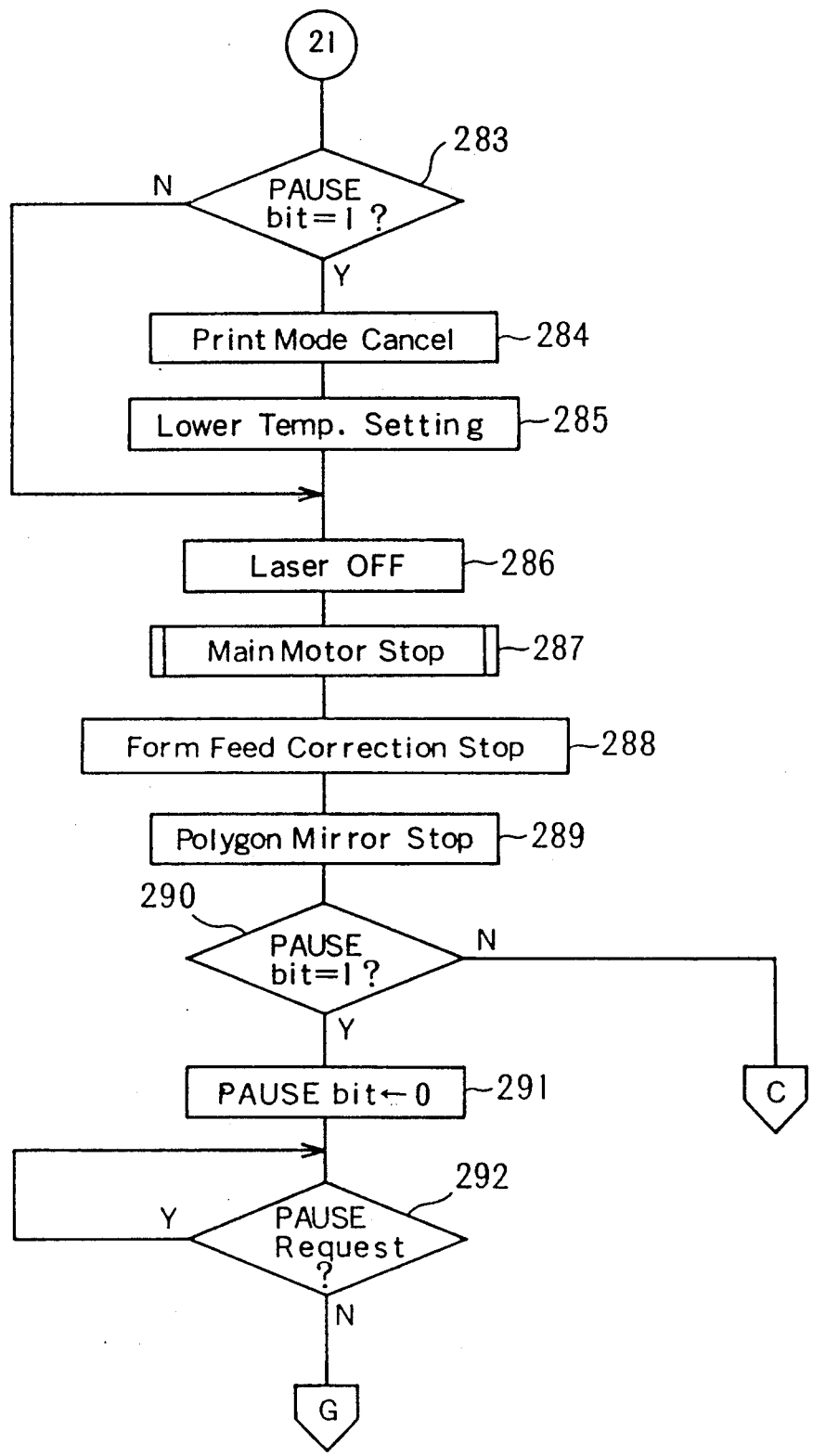

The stop processing routine shown in FIG. 17 is described below.

In this stop processing routine, if it is determined in STEP 270 that the number of PFS pulses has reached 22, the F clutch is disconnected in STEP 272, and the feeding of the continuous form is stopped. Then, in STEP 273, it is determined whether or not a T bias voltage for a transfer has been turned OFF. In STEP 270, if it is determined that the number of PFS pulses has not reached 22, in STEP 271 it is determined whether or not the STOP signal has been input. If the STOP signal has been input, the process goes to the emergency stop routine. Conversely, if the STOP signal has not been input, the process returns to STEP 270. Similarly, in STEP 273, if it is determined that the T bias voltage has not been turned OFF, in STEP 274 it is determined whether or not the STOP signal has been input, and if the STOP signal has been input, the emergency stop routine is carried out.

When this routine is carried out due to the issuance of a PAUSE request, i.e., the pause bit is "1" in STEP 275, the process goes from STEP 275 to STEP 276, in which it is determined whether or not a FF (form feed) request has been issued, and then STEPS 277 through 281 are carried out and a form discharge process is carried out. This process is described later.

Conversely, when this routine is carried out for a reason other than the issue of a PAUSE request, STEPS 277 through 281 are skipped and the process goes to STEP 282, in which the press roller is moved down. Then if in STEP 283, it is determined that the PAUSE bit is not "1", then STEPS 284 and 285 are skipped, the laser is turned OFF in STEP 286, the main motor is stopped in STEP 287, a correction of the continuous form feeding is prohibited in STEP 288, and the polygon mirror is stopped in STEP 289. The process then branches off from STEP 290 to return to STEP 017 of FIG. 7.

As understood from this flow chart, when the PAUSE request is not issued and the printing is normally finished and the next printing awaited, one page of continuous form, which has not been fixed, remains in the printer. This is because, as the printer is a page printer in which a continuous form is used, if all of the transferred part were fixed at every stoppage of the printing process, the next page to the page which has been fixed would be fed without being transferred, and thus that one page becomes useless.

Note, in the case in which the end of the continuous form is reached, even if the last page is fixed, since it is the last page, the useless page of the continuous form as described above can not exist. Further, since the sprocket holes are engaged with projections of the tractor unit of the printer when a new continuous form is set therein, if the last page remains in the printer, the new continuous form cannot be set to the printer. Still further, when the PAUSE request is issued due to an error relating to a toner, if the printer is simply stopped, an unfixed page remains in the printer. Therefore, if the power supply is cut at that stage, the printed result on the last page cannot be used.

Therefore, in the printer of this embodiment, when the stop processing routine is carried out due to the issuance of a PAUSE request, in the process of STEPS 276 through 281, the printing of the page being printed is continued until the printing of that page is completed. the page is then fixed and discharged from the printer, and the operation of the printer is then stopped.

When the end of the continuous form is reached. the FF request is outputted at the same time and the process goes from STEP 276 to STEP 277, in which the PFS counter is cleared and the F clutch is connected. Then, in STEP 278, the continuous form is fed until the number of PFS pulses reaches 28, and the F clutch is then disconnected in STEP 279.

In the case of a toner error, the FF request is not issued and the process goes from STEP 276 to STEP 280, in which the PFS counter is cleared and the F clutch is connected. Then, the continuous form is fed until the number of PFS pulses reaches 22 in STEP 281, and the F clutch is disconnected in STEP 279.

Note that, although the length of one page of the continuous form is 11 inches, and corresponds to 22 PFS pulses, when the end of the continuous form is reached, since the continuous form is separated from the tractor unit during the feeding, the speed of the tractor unit is lowered to 50 mm/s, whereby the interval between two PFS pulses is lengthened. Therefore, taking a margin into consideration, the continuous form is fed until the number of PFS pulses reaches 28.

When one page of the continuous form is discharged from the printer, the press roller is moved down in STEP 282. the print mode is cancelled in STEP 284, the temperature of the heat roller is then set to a lower temperature in STEP 285, and accordingly, the process goes to STEPS 286 through 289, described above.

Namely, when a low priority error relating, for example, to a toner, occurs, the printing and fixing of the page being printed when the error occurs is completed, and after the completion of the printing and fixing of that page, the printing and fixing processes are stopped.

In STEP 291, a PAUSE bit is cleared, and in STEP 292, the process waits until the PAUSE request is cancelled, and then goes to STEP 054 in FIG. 8.

Note that, when one page of the continuous form is discharged from the printer due to a toner error, the page following the discharged page is not printed, and therefore, a blank page is discharged at the next printing. Therefore, the printer may be constructed in such a manner that symbols or letters denoting a toner low state or a toner overflow state are printed on the blank page by an output from the pattern generator, whereby, in the next printing, the kind of error that caused the stoppage of the printer in the previous printing is recognized.

The description now returns to FIG. 10.

If the PAUSE request is not issued and the printing is continued, the process goes to STEP 095, in which it is determined whether or not the self-print mode has been set. If the self print mode has been set, STEP 096 is skipped and the process goes to STEP 097, and if the usual print mode has been set, STEP 096 is carried out so that the HS request is issued.

The process of STEPS 097 through 102 is provided for setting the APC (automatic output control) of the laser during the feeding of the continuous form to the next page. The APC is started in STEP 097, and a 20 ms second timer is started in STEP 098. Then in STEP 099 it is determined whether or not 20 ms has passed from the start of the timer, and in STEP 100 it is determined whether or not the STOP signal has been inputted from the B-IC. If the STOP signal has been inputted, the emergency stop routine is carried out. If it is determined in STEP 098 that 20 ms has passed, the 20 ms timer is stopped in STEP 101, and in STEP 102, it is determined whether or not the setting of the APC has been completed. If the setting of the APC has not been completed, the error processing routine is carried out.

If the setting of the APC has been completed, the process goes to STEP 103, in which it is determined whether or not the self-print mode has been set. If the self-print mode has been set, the pattern generator is again started in STEP 104, and the Generator ON state is confirmed in STEPS 105 and 106. That is, if it is determined in STEP 105 that the pattern generator has been started, the PFS is set to "−4" in STEP 107, and the process then returns to STEP 081 in FIG. 9, whereby the printing is carried out. If in STEP 105 it is determined that the generator has not been started, the process goes to STEP 106, in which, if it is determined that the STOP signal has not been input, the process returns to STEP 105, Conversely, if it is determined that the STOP signal has been input, the emergency stop routine is carried out.

In STEP 103, if it is determined that the usual print mode has been set, in STEPS 108 and 109 it is determined whether or not an exposure has been started. If the exposure has been started, the process goes from STEP 108 to STEP 110, in which the HS request is cancelled, and the process goes to STEP 107.

The above completes the description of the main routine and the subroutines branched off from the main routine. Now, two interrupt processing routines carried out independently from the main routine will be described.

FIG. 18 shows a timer interrupt routine carried out at every count of the control timer. This interrupt routine has the highest priority, and therefore, when this routine is started, all other routines are prohibited.

When the motor ON bit is set to "0", the control timer is formed as a 1 ms timer based on a 38.4 $\mu$s clock, which is the same as the control timer start in STEP 002 of the main routine, so that the timer interrupt is carried out at every 1 ms. In this case, the process goes from STEP 300 to STEP 301, in which the control timer is stopped. The control timer is then started within 1 ms in STEP 302, the interrupt prohibition is cancelled in STEP 303, and the process returns to the routine at which this sub-routine was requested.

When the main motor start routine is carried out so that the motor ON bit is set to "1", the control timer is used for defining a pulse for driving the main motor. In this case, the control timer outputs a pulse in accordance with a 1.2 $\mu$s clock signal, and thus the timer interrupt is carried out at each input of this clock signal.

To ensure an accurate correction of the drive pulse of the main motor, the pulse is generated in accordance with the 1.2 $\mu$s clock signal. To enable this pulse to be generated by using an 8 bit timer, one hardware timer is operated as 4 timers by software, and these 4 timers are continually operated so that a 1 ms pulse is defined.

When the main motor is just started, since the motor RDY bit is set to "0", the process goes from STEP 304 to STEP 305, in which it is determined whether or not the P count is less than 1. The P count is set to "159" in STEP 201 shown in FIG. 13, and when the main motor is just started, since the P count is about "159", the process goes from STEP 305 to STEPS 306, 307, 308 and 309, in which the main motor is started at a slow speed and gradually accelerated to a high speed.

The main motor used in this embodiment is self-accelerated to 300 rpm. To enable use of the main motor at a rotation speed of about 1000 rpm, during an increase from 300 rpm to 1000 rpm, a frequency of the drive pulse is exponentially changed within about 200 ms, so that the rotation speed of the main motor is changed from a low speed to a high speed.

First, until STEP 306 is carried out by the number corresponding to the initial value of the VALUE count set in STEP 202 shown in FIG. 13, STEPS 307 and 308 are skipped, and the process goes to STEP 309, in which the VALUE count is set to the control timer to determine a frequency of the drive pulse of the main motor. In STEP 310, phase data for operating the main motor is output, and the process goes to STEP 303 and this interrupt routine is ended.

This process is repeated, at the frequency set by the control timer, until the timer interrupt routine has been carried out for the number of times corresponding to the VALUE count. When the process is repeated for the number of times corresponding to the VALUE count, STEP 307 is carried out so that new data is set to the VALUE count. Then, in STEP 308, the P count is decreased by "1", the new VALUE count is set to the control timer in STEP 309, and new phase data is output in STEP 310.

The number of data needed for accelerating the motor from a slow speed to a high speed totals 160. Therefore, the above operation is repeated until the P count becomes less than "1" in STEP 305, whereby the rotation speed of the main motor reaches a predetermined value.

When the P count becomes less than "1", the process goes from STEP 305 to STEP 311, in which the motor RDY bit is set to "1". Then the control timer is once stopped in STEP 312, and is set to 262 $\mu$s in STEP 313 and restarted. In STEP 314, a control timer Carry count for controlling the control timer is set to "1". Then, the process goes to STEPS 310 and 303 and the processing is ended. As a result, the next timer interrupt routine is carried out after 262 μs.

Note that STEPS 311 through 314 are carried out once during a main motor start routine.

The next interruption is carried out 262 μs after the previous process. Since the motor RDY bit has been set to "1" in STEP 311, the process goes from STEP 304 to STEP 315, in which the condition of a control timer END bit is determined. Initially, this bit is set to "0", and therefore, the process goes to STEP 316 in which it is determined whether or not the control timer Carry has a borrow, i.e., whether or not the control timer Carry is less than "0".

When STEP 316 is carried out for the first time, since the control timer Carry bit was set to "1" in STEP 314, STEPS 317 through 319 are skipped and STEP 320 is carried out to decrease the control timer Carry bit by 1, and then the process returns to the routine at which this sub-routine was requested.

Since the control timer remains set at 262 μs, after the motor RDY bit is set to "1" in STEP 311 in the previous procedure, the second and the third interrupt routines are carried out every 262 μs. When the second interrupt routine is carried out, a borrow occurs in the control timer Carry in STEP 320, and thus in the third interrupt routine, the process goes from STEP 316 to STEP 317, in which the control timer Carry is set to "2". Then, in STEP 318, the value of the control timer is changed to a value of a control timer count which is set in a PFS interrupt routine described later. Note, the value of the control timer count is obtained by multiplying the number of clock signals by 1.2. In STEP 319, the control timer END bit is set to "1", and then STEPS 320 and 303 are carried out to end this process.

The control timer count is used for correcting a width of the drive pulse of the main motor, and the time until the next interrupt is controlled by the value of the control timer newly set in STEP 318.

Upon the next interrupt routine, since the result is affirmative in STEP 315, the process goes to STEP 321, in which the control timer END bit is cleared. Then the control timer is stopped once in STEP 322, is set to 262 μs again in STEP 323, and the process passes through STEPS 310 and 303 to return to the routine at which this sub-routine was requested.

By repeatedly carrying out this process, four timers, i.e., three 262 μs timers and one timer defined by the control timer count, are formed, and the phase data for the main motor is output at the times defined by the four timers, whereby the drive pulse for the main motor is determined.

Figure 19A:
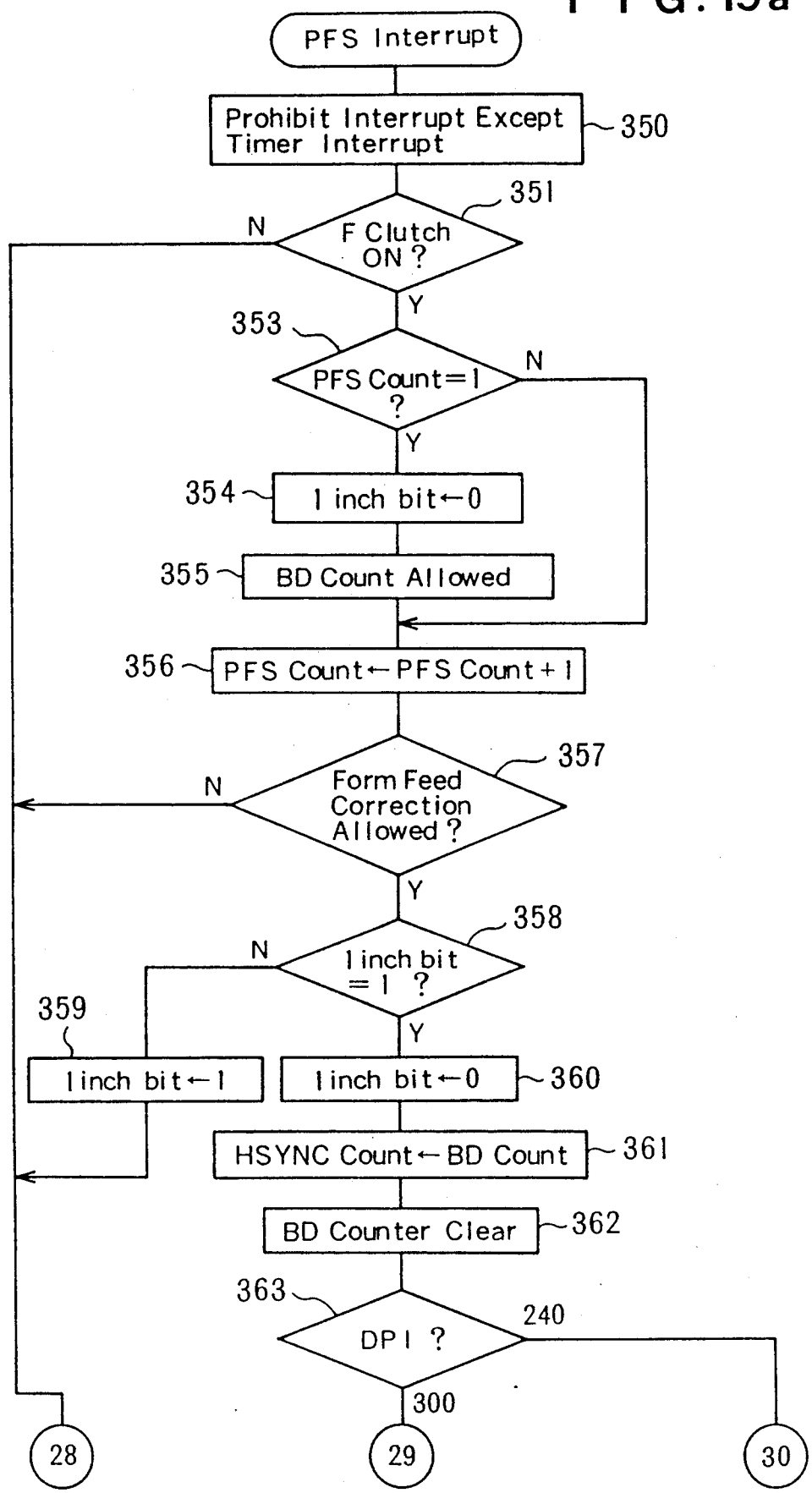
FIGS. 19a and 19b illustrate a flow chart of a PFS interrupt routine.
Figure 19B:
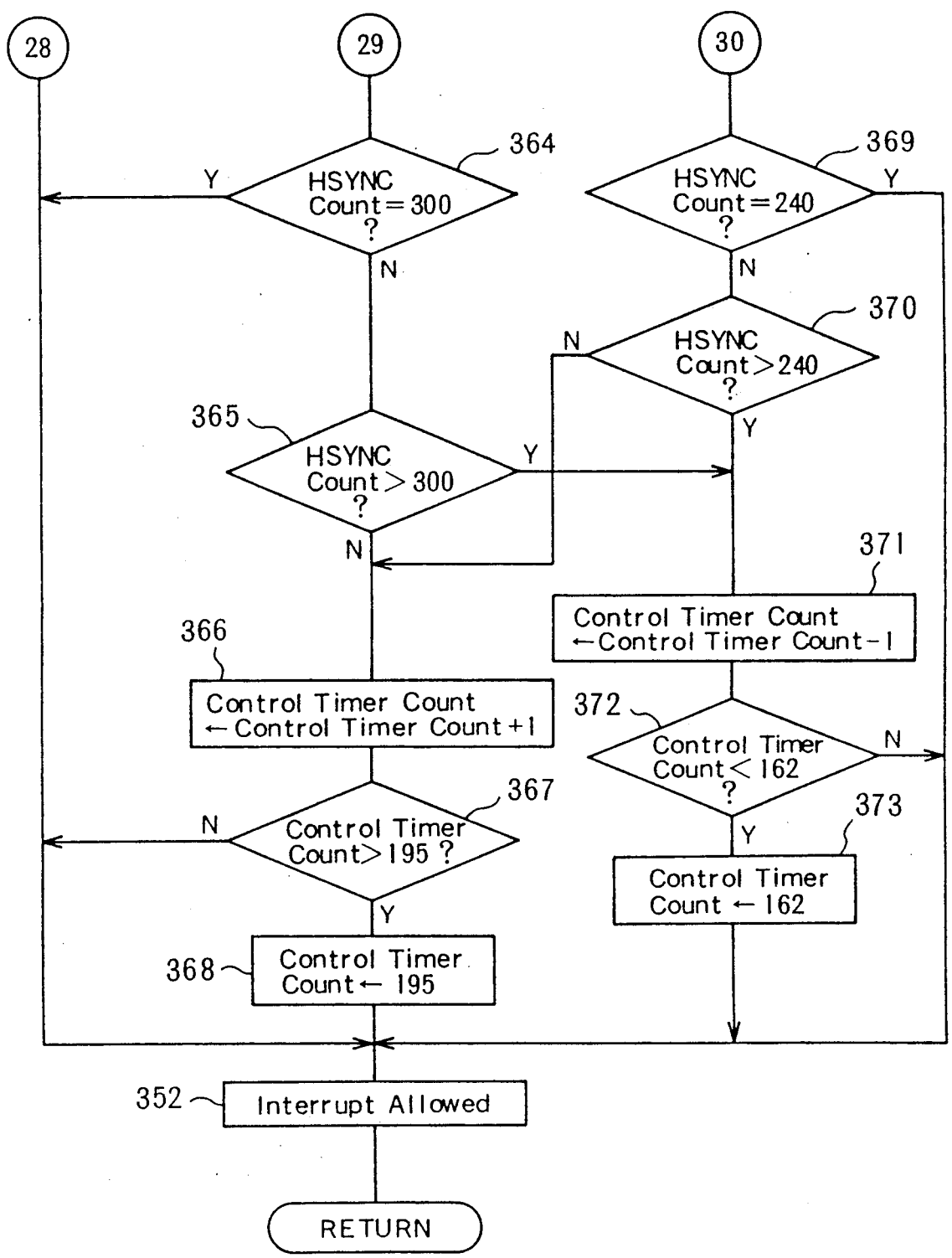

The PFS interrupt routine shown in FIG. 19 is described below. This interrupt routine is started when the PFS pulse rises. In the PFS interrupt routine, the control timer count by which a width of the drive pulse for the main motor is corrected is set by measuring a feeding speed of the continuous form in accordance with the PFS signal, based on a horizontal synchronized signal output from the BD sensor.

In this routine, an interrupt other than the timer interrupt described above is prohibited in STEP 350, and in STEP 351, it is determined whether or not the F clutch is connected. Even if the main motor has been driven, when the continuous form is not fed, the PFS pulses are not outputted, and therefore, no correction is needed.

Therefore, in this case, an interrupt is allowed in STEP 352, and this routine is ended.

When the F clutch is connected, the process goes to STEP 353, in which it is determined whether or not the PFS count is "1". The PFS count is set to "0" when a boundary between two pages comes to a position directly under the sensitive drum, in the main routine, or in a tip position set routine in which a tip of the continuous form is set to a predetermined position. The process goes to STEPS 354 and 355 when the PFS interrupt routine is carried out for the first time, so that a 1 inch bit is cleared and a count for the BD signal is allowed.

Then, in STEP 356, the PFS count is increased by 1, and in STEP 357, it is determined whether or not a form feeding correction has been allowed. The form feeding is corrected to adjust a deviation of a printing position and prevent deformation of the printed letters, and therefore, the correction is allowed between STEP 037 in FIG. 8 and STEP 288 in FIG. 17. When the tip position set routine is not carried out, even if the continuous form feeding is carried out, the amount of continuous form fed need not be corrected. Therefore, in this case, the correction is not allowed.

When the correction is not allowed, the process goes from STEP 357 to STEP 352 and is ended. Conversely, when the correction is allowed, in STEP 358 it is determined whether or not the 1 inch bit has been set to "1". Although the PFS pulse is generated at every ½ inch of form feeding, since in this printer the form feeding correction is carried out at every 1 inch of form feeding, the content of the 1 inch bit is changed in STEPS 359 and 360, and thus it is determined whether or not the PFS pulse denotes an inch of an integer number.

When the inch is an integer number, the number of BD pulses corresponding to 1 inch is set to an HSYNC count in STEP 361, and the BD counter is then cleared in STEP 362. Then, in STEP 363, it is determined what resolving power of the printer has been set, so that a correction corresponding to the resolving power DPI (the number of scanning lines per inch) is carried out.

In this correction, it is assumed that the output of the BD pulses is accurate, and it is assumed that the initial value of the control counter has been set to 178 (corresponding to about 214 μs), for example, when the form feeding is allowed.

First, in STEPS 364 and 369 it is determined whether or not the HSYNC count coincides with the number of the resolving power set at that time. If the HSYNC count coincides with that number, this means that the form feeding is being carried out correctly, and thus the control timer count is not changed and the process is ended.

Conversely, if the HSYNC count does not coincide with that number, in STEPS 365 and 370, it is determined whether or not the HSYNC count is larger than a predetermined value. If the HSYNC count is lower than the predetermined value, this means that the form feeding speed is higher than the laser scanning speed. Therefore, the control timer count is increased by 1 in STEP 366, and thus a frequency of the drive pulse for the main motor is lowered. Conversely, if the HSYNC count is larger than the predetermined value, this means that the form feeding speed is lower than the laser scanning speed. Therefore, the control timer count is decreased by 1 in STEP 371, and thus a frequency of the drive pulse for the main motor is raised.

Note that STEPS 366, 368, 372 and 373 are provided for defining the upper and lower limits of the control timer, and due to these STEPS, a correction range for the control timer is set to 214 μs±20 μs. Namely, as shown above, a speed of the main motor is changed to correct a speed of the form feeding.

Figure 21:
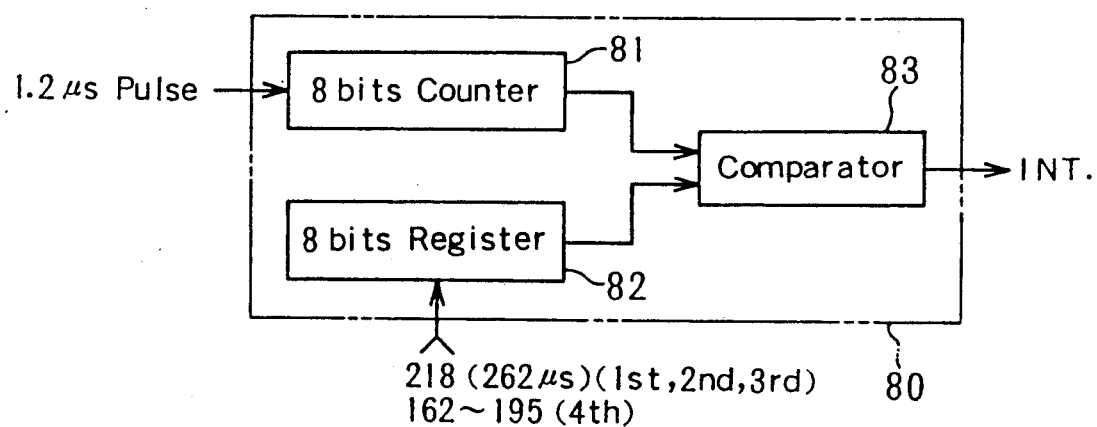
FIG. 21 is a block diagram of a timer.

FIG. 21 shows a timer 80 constructed in the A-IC. The timer has an 8 bit counter 81 corresponding to the control timer described with reference to FIG. 18, an 8 bit register 82, and a comparator 83. A clock signal generated by the clock generating circuit provided in the A-IC is inputted to the 8 bit counter 81 every 1.2 μs, whereby the content of the counter 81 is increased by 1 every 1.2 μs. The register 82 stores a number corresponding to a constant time or a variable time. The contents of the counter 81 and the register 82 are input to the comparator 83, which outputs a signal "INT" denoting a count of the timer 80 when the content of the counter 81 becomes equal to the content of the register 82, so that the timer interrupt routine shown in FIG. 18 is carried out.

In this embodiment, the 8 bits register 82 stores "218", which is a constant value and corresponds to the constant time, i.e., 262 μs, in the first, second and third counting operations of the timer 80. Therefore, the timer 80 counts the 1.2 μs pulses to "218", three times. Further, the 8 bit register 82 stores a number between "162" and "195", which is a variable value and corresponds to the variable time, i.e., a time of 214 μs±20 μs, in the fourth counting operation of the timer 80. This variable value is varied in accordance with an interval between the PFS pulses, which corresponds to a form feeding speed.

Thus, a width of the drive pulse for the main motor is determined by summing up a time obtained by multiplying the constant time by three and adding the variable time, whereby a speed of the main motor is adjusted to a required value.

Figure 22:
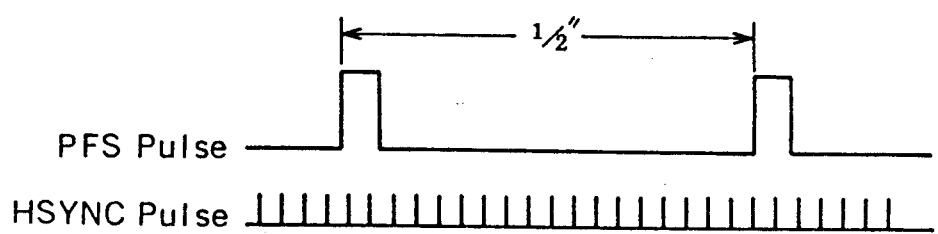
FIG. 22 is a diagram of showing a relationship between PFS pulses and HSYNC pulses.

FIG. 22 shows the PFS pulses and HSYNC pulses. The PFS pulses are generated in accordance with a form feeding speed, and therefore, the interval between two PFS pulses varies in accordance with a change of the feeding speed due to, for example, an expansion of the form. The HSYNC pulses are generated by the scanning optical system at a constant interval, and therefore, the number of the HSYNC pulses between two PFS pulses is changed in accordance with the form feeding speed, so that the content of the control timer counter is changed in STEP 366 or 371 in FIG. 19, and the content of the 8 bits register 82 is changed in STEP 318 in FIG. 18, and as a result, the variable time is changed so that the width of the drive pulse is changed.

Note, that since the correction is carried out by one count (corresponding to 1.2 μs) for 1 inch as described above, the correction is carried out with a very small unit to a standard width of the drive pulse.

Therefore, for example, when there is a 10 pulse error at the resolving power DPI, the correction is completed by feeding the form by 10 inches. Namely, the feeding speed is gradually adjusted to a required value. The correction is carried out at every one count because, if the correction is carried out by a plurality of counts at the same time, the feeding speed would be abruptly changed and deformation of the printed letters could occur.

Although the embodiments of the present invention have been described herein with reference to the accompanying drawings, obviously many modifications and changes may be made by those skilled in this art without departing from the scope of the invention.

What is claimed is:

1. A stopping process control device for a laser printer having means for printing an image on a continuous form and means for fixing said image to said continuous form, comprising:
    means for detecting an error occurring in said laser printer;
    means for determining a priority of said error detected by said detecting means; and
    means for controlling said printing means and said fixing means so as to stop said printing means and said fixing means after a page that is in the process of being printed is completed when said determining means determines that a low priority error is detected by said detecting means, said controlling means immediately stopping said printing operation when said determining means determines that a high priority error is detected.

2. The stopping process control device of claim 1, wherein a plurality of detecting means are provided, each of said detecting means detecting a different kind of error.

3. The stopping process control device of claim 1, wherein said determining means outputs a first signal when a low priority error that occurs and a second signal when a high priority error occurs, said control means stopping the operation of said printing means and said fixing means after completing a printing and fixing of a page that is in the process of being printed when said first signal is inputted to said control means, and immediately stopping the operation of said printing means and said fixing means when said second signal is inputted to said control means.

4. The stopping process control device of claim 1, further comprising means for feeding said continuous form in said printer, said control means stopping the operation of said printing means and said fixing means after completing the printing and fixing of a page that is in the process of being printed when said determining means determines that said error is a low priority, and thereafter controlling said feeding means to discharge said page from said laser printer.

5. A stopping process control device provided in a laser printer that has means for printing an image on a continuous form and means for fixing said image to said continuous form, comprising:
    means for detecting when an error occurs in said laser printer;
    means for determining a priority of said error detected by said detecting means; and
    means for controlling a printing process of said printing means and a fixing process of said fixing means, in accordance with a determination of said priority of said detected error;
    said control means stopping said printing process and said fixing process after completing a printing and fixing of a page that is in the process of being printed when said determining means determines that said error is of a low priority, and immediately stopping said printing process and said fixing process when said determining means determines that said error is of a high priority.

6. A laser printer having means for printing an image on a continuous form, means for fixing said image to said continuous form, and means for detecting various errors occuring in said laser printer, comprising:
    means for determining whether an error detected by said detecting means has a high priority; and means for controlling said printing means and said fixing means when said determining means determines that said detected error is not a high priority error so that said printing means completes a printing process for a page that is currently being printed and then fixes said printed image to said page before stopping said operation of said printing means and said fixing means, but immediately stops said operation of said printing means and said fixing means when said determining means determines that said detected error is a high priority error.

7. A control device for stopping the operation of a printer, comprising:

means for detecting when an error occurs in said printer;

means for determining a priority of said error detected by said detecting means; and means for stopping a printing operation of said printer after a page that is in the process of being printed is completed when said determining means determines that a low priority error is detected by said detecting means, and immediately stopping said printing operation when said determining means determines that a high priority error is detected.

8. The control device of claim 7, wherein said error detecting device comprises a plurality of error detecting means, each error detecting means detecting a different type of error.

9. The control device of claim 7, wherein said determining means outputs a first signal to said stopping means when said low priority error occurs and a second signal to said stopping means when said high priority error occurs.

10. The control device of claim 9, wherein said stopping means stops said printing operation after completing the printing of a page that is in the process of being printed when said first signal is inputted to said stopping means.

11. The control device of claim 10, wherein said stopping means immediately stops said printing operation when said second signal is inputted to said stopping means.

12. A laser printer having means for printing an image on a form, means for fixing said image to said form, and means for detecting various errors that may occur in said laser printer, comprising:

means for determining a priority of an error detected by said detecting means; and means for controlling said printing means and said fixing means so as to complete printing an image on a page of said form that is currently being printed and then fix said printed image to said page before stopping the operation of said printing means and said fixing means when a low priority error is detected by said detecting means, and immediately stopping the operation of said printing means and said fixing means when a high priority error is detected by said detecting means.

13. The laser printer of claim 12, wherein said high priority error comprises a paper jam.

14. The laser printer of claim 12, wherein said form comprises a continuous form.

15. The laser printer of claim 12, wherein said low priority error comprises a toner overflow condition.

16. The laser printer of claim 12, wherein said low priority error comprises a low toner condition.

17. The laser printer of claim 12, wherein said low priority error comprises an indication that an end of said form has been reached.

* * * * *